US00RE50406E

(19) United States
(12) Reissued Patent
Folkersen et al.

(10) Patent Number: US RE50,406 E
(45) Date of Reissued Patent: Apr. 29, 2025

(54) LAYOUT STARTER AND FIELD SHINGLE FOR SLOPED ASPHALT ROOFING

(71) Applicant: Roofers' Advantage Products, LLC, E. Wakefield, NH (US)

(72) Inventors: Jonny E Folkersen, East Wakefield, NH (US); Benjamin Folkersen, New Port Richey, FL (US)

(73) Assignee: Roofers' Advantage Products, LLC, E. Wakefield, NH (US)

(21) Appl. No.: 17/523,365

(22) Filed: Nov. 10, 2021

Related U.S. Patent Documents

Reissue of:
(64) Patent No.: 10,577,800
Issued: Mar. 3, 2020
Appl. No.: 16/449,570
Filed: Jun. 24, 2019

U.S. Applications:
(60) Continuation-in-part of application No. 16/030,084, filed on Jul. 9, 2018, now Pat. No. 10,364,573, which
(Continued)

(51) Int. Cl.
*E04D 1/26* (2006.01)
*E04D 1/00* (2006.01)
*E04D 1/34* (2006.01)

(52) U.S. Cl.
CPC ..... *E04D 1/26* (2013.01); *E04D 1/34* (2013.01); *E04D 2001/005* (2013.01); *Y10T 428/24736* (2015.01)

(58) Field of Classification Search
CPC .... E04D 1/26; E04D 1/29; E04D 1/34; E04D 1/00; E04D 15/02
See application file for complete search history.

(56) References Cited

U.S. PATENT DOCUMENTS 3,624,975 A * 12/1971 Morgan ..... E04D 1/26 52/105
3,638,388 A 2/1972 Crookston
(Continued)

OTHER PUBLICATIONS

Office Action for U.S. Appl. No. 16/711,602, dated Jul. 17, 2020, 12 Pages.
(Continued)

*Primary Examiner* — Matthew J Kasztejna
(74) *Attorney, Agent, or Firm* — Maine Cernota & Curran

(57) ABSTRACT

Herein disclosed is an asphalt roofing shingle, adapted to be laid up in courses on a roof, comprising an upper headlap portion, a lower tab portion, vertically spaced apart upper and lower edges, laterally spaced apart right and left edges and top and bottom surfaces. The bottom surface is configured to be laid up on a roof facing the roof and the tab portion of the top surface is configured to be substantially weather-exposed when laid up on a roof. The upper headlap portion is configured to be substantially covered by the tab portion of roofing elements in a next-overlying course of roofing elements when laid up on a roof. The upper headlap portion further comprises a plurality of parallel, evenly laterally spaced, first markings, the first markings being useful, at least, for aligning adjacent shingles, cutting books of shingles, forming starter shingles from full shingles and forming a grid of shingles without external measuring devices.

18 Claims, 20 Drawing Sheets

Related U.S. Application Data is a division of application No. 15/365,201, filed on Nov. 30, 2016, now Pat. No. 10,041,253, which is a continuation of application No. 14/626,436, filed on Feb. 19, 2015, now Pat. No. 9,540,817.

(56) References Cited

U.S. PATENT DOCUMENTS

| | | | | |
|---|---|---|---|---|
| 3,691,343 | A | 9/1972 | Norman | |
| 3,927,501 | A | 12/1975 | Allen et al. | |
| 4,437,274 | A | 3/1984 | Slocum | |
| 4,466,226 | A | 8/1984 | Rohner | |
| 4,468,909 | A * | 9/1984 | Eaton | E04D 1/265 52/541 |
| 4,499,702 | A * | 2/1985 | Turner | E04D 1/26 52/555 |
| 4,637,191 | A * | 1/1987 | Smith | E04D 1/26 52/522 |
| 5,950,387 | A * | 9/1999 | Stahl | E04D 1/29 52/748.1 |
| 6,145,265 | A * | 11/2000 | Malarkey | E04D 1/26 52/745.19 |
| 6,199,338 | B1 * | 3/2001 | Hudson, Jr. | E04D 1/26 52/105 |
| 6,511,741 | B1 | 1/2003 | Hungarter | |
| 6,523,275 | B2 | 2/2003 | Medford et al. | |
| 6,708,456 | B2 * | 3/2004 | Kiik | E04D 1/26 442/64 |
| 6,990,779 | B2 * | 1/2006 | Kiik | A47G 27/0468 52/314 |
| 7,204,063 | B2 | 4/2007 | Kandalgaonkar | |
| 7,475,516 | B2 | 1/2009 | Jolitz et al. | |
| 7,617,613 | B2 | 11/2009 | Merryfield, Jr. | |
| 8,240,100 | B2 * | 8/2012 | Kalkanoglu | E04D 1/26 52/518 |
| 8,240,102 | B2 | 8/2012 | Belt et al. | |
| 8,567,601 | B2 | 10/2013 | Turek et al. | |
| 8,689,510 | B1 | 4/2014 | Krumvieda | |
| 8,713,883 | B2 | 5/2014 | Thies, III | |
| 8,726,611 | B2 * | 5/2014 | Swei | E04D 5/142 52/105 |
| 8,813,453 | B2 | 8/2014 | Kalkanoglu et al. | |
| 8,984,835 | B2 | 3/2015 | Kalkanoglu et al. | |
| 9,290,943 | B2 | 3/2016 | Grubka | |
| 9,410,323 | B1 * | 8/2016 | Leitch | E04D 1/12 |
| 2001/0022055 | A1 | 9/2001 | Zhang | |
| 2004/0148895 | A1 * | 8/2004 | Jolitz | E04D 1/12 52/518 |
| 2006/0265989 | A1 | 11/2006 | Geary | |
| 2006/0265990 | A1 * | 11/2006 | Kalkanoglu | B32B 37/1284 52/518 |
| 2008/0083187 | A1 * | 4/2008 | Dennis | E04D 1/265 52/527 |
| 2008/0289291 | A1 | 11/2008 | Chestnut, Jr. | |
| 2010/0212235 | A1 | 8/2010 | Barrego | |
| 2011/0041421 | A1 | 2/2011 | Jenkins | |
| 2012/0079734 | A1 | 4/2012 | Greenway | |
| 2012/0174517 | A1 | 7/2012 | Jenkins | |
| 2012/0247062 | A1 | 10/2012 | Elsasser | |
| 2012/0291367 | A1 | 11/2012 | Kirkey | |
| 2013/0247507 | A1 | 9/2013 | Solomon | |
| 2016/0340903 | A1 | 11/2016 | Folkersen | |

OTHER PUBLICATIONS

Office Action for U.S. Appl. No. 16/711,602, dated Oct. 27, 2020, 13 Pages.

Notice of Allowance for U.S. Appl. No. 16/711,602, dated Jan. 15, 2021, 8 Pages.

* cited by examiner

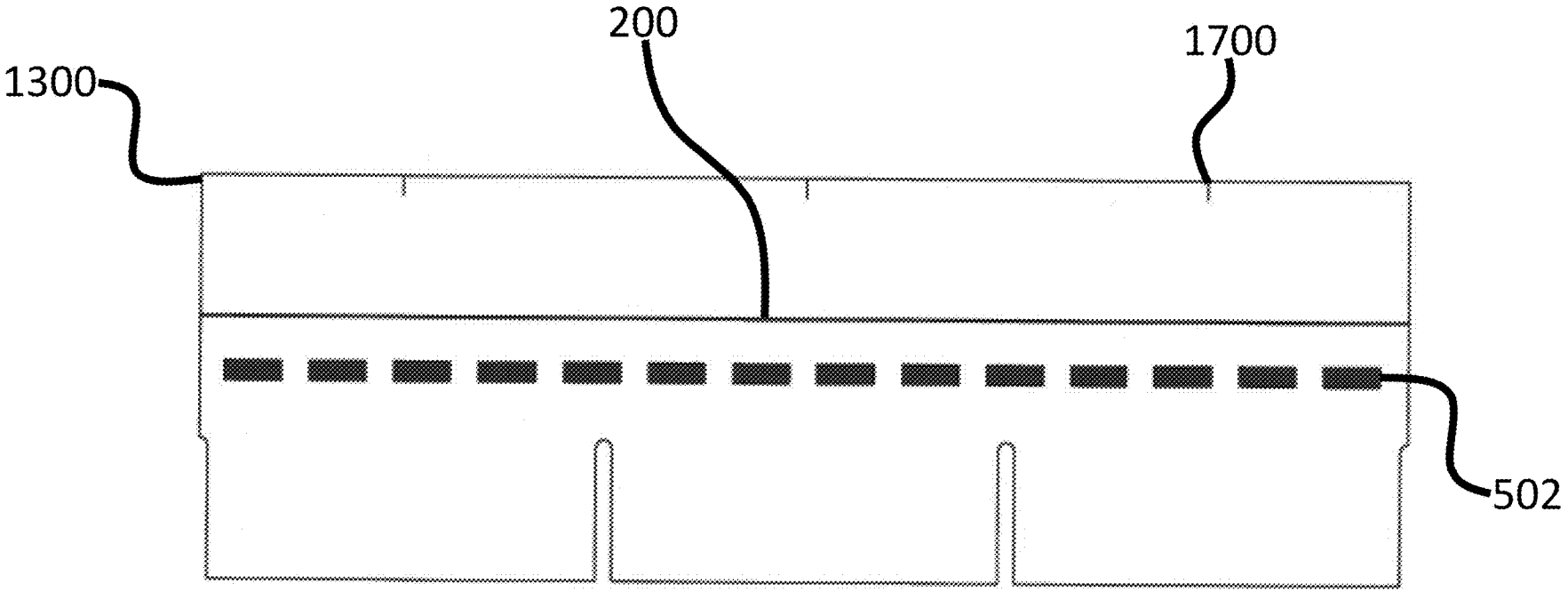
Figure 17
(Amended)

LAYOUT STARTER AND FIELD SHINGLE FOR SLOPED ASPHALT ROOFING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application is a continuation in part of U.S. application Ser. No. 16/030,084, filed Jul. 9, 2018, which is a divisional of U.S. application Ser. No. 15/365,201, filed Nov. 30, 2016, which is a continuation of U.S. application Ser. No. 14/626,436, filed Feb. 19, 2015. These applications are herein incorporated by reference in their entirety for all purposes.

FIELD OF THE INVENTION

The invention relates generally to roofing, and, more particularly, to asphalt shingles used in sloped roofing applications.

BACKGROUND OF THE INVENTION

Installation of sloped roofing components, particularly asphalt shingles, requires a great deal of precision in order to provide a strong and aesthetically pleasing end result.

The layout and proper fastening of asphalt sloped roofing are generally considered the most critical aspects of any sloped asphalt shingle roof installation. The layout determines where nails are placed, the side lap of the shingles, shingle reveal to the weather, shingle overhang, aesthetics and square-ness coming off the rake; factors which the long term storm resistance and general performance of the completed roofing system are dependent upon. Consistent layout and proper fastening makes for a stronger and more aesthetically pleasing roof, allowing manufacturers to offer longer warranty periods.

The layout of field shingles, or shingles in the central portion of the roof, in particular, is critical to performance of the system and to the completed look of the roof. Today, applicators are employing a number of methods to ensure proper placement when laying out a roof. Typically, a standard tape measure and lumber crayon are used, with marks being placed directly onto the underlayment. Once the marks have been made, a chalk line is often used to connect the marks from rake to rake or rake to roof protrusion. This layout method is prone to errors, primarily due to human variables, as applicators often mark the underlayment slightly differently and/or hold the line to be snapped at a slightly different point relative to a mark. Once the installation starts, miss-marks or human variables can compound, adversely affecting the aesthetics and performance of the completed roof.

Although shingles are primarily laid out using a standard tape measure, as described above, specialty tools do exist to ease the job of the installer. For instance, US patent application US20120079734 discloses a roof layout tape measure. Another invention, U.S. Pat. No. 6,523,275, discloses a roof layout tape and method of use. This tape is meant to be buried and left under the shingles. In both instances, additional tools and materials must be purchased, transported to the jobsite, hauled onto the roof surface and, in the latter case, consumed during installation.

Other current methods of ensuring alignment of roofing shingles involve application of underlayment utilizing a grid to assist shingle installers or the use of a tape measure, chalk and taught string to "snap a line," creating a grid on the surface to which shingles are to be attached. The method of "snapping a line" requires some skill by the installer and each installer may measure somewhat differently, causing errors in alignment. The method of using underlayment having a grid thereon uses extra materials, is difficult to keep straight, with multiple sections often being required creating alignment issues over long distances, and adds to the time and expense of installation.

Despite the specialized design and usage of the products and methods herein described, these approaches not only fail to provide acceptable methods of ensuring proper shingle application and alignment, they also do not aid in the creation of starter books, still rely on the snapping of chalk lines, as in the prior art and with its known disadvantages, and do not assist the installer in circumnavigating roof protrusions or damaged areas.

Additionally, modern roofing materials and methods only provide limited direction to installers as to their particular mounting requirements and methods to be followed to provide the best possible end result. Oftentimes, such instructions, if any, are included on the packaging, which is often destroyed during the unpacking process. This results in installers installing such shingles according to generally accepted practices rather than to any particular manufacturer's specific criteria, often resulting in an inferior outcome, and one that manufacturers may be unwilling to stand behind should the owner attempt to have repairs performed under warranty.

Another issue faced by modern roofers is work interruption related to protrusions encountered or areas in need of repair, especially those in the field section of the roof and during initial construction. When a roof protrusion, such as a vent or skylight, is encountered, the roofer must often stop roofing in order to allow another contractor to perform work related to the protrusion, such as installation or repair, before continuing roofing. This is because the layout of further shingles is generally dependent on the previously installed shingles. This delay can be especially troublesome in cases where the contractor is unavailable for an extended period of time, preventing the roof from being completed in a timely manner and potentially exposing the interior of the construct to the elements during this period of delay.

Still another issue faced by roofers is shingle wandering. On large open field areas where no protrusions are found shingle wandering is common place. Shingle wandering describes the angular movement of the butt end of the shingle away from a parallel, abutting, relationship with a prior shingle. This creates uneven exposed roofing courses and may affect the performance and appearance of the finished roof.

Furthermore, shingle wandering is a problem facing both laminate, i.e. architectural, shingles as well as three-tab shingles, which remain in widespread use as a cost-effective alternative to laminate shingles. While three tab shingles typically include cut-outs between tabs that may be used to align subsequent courses of shingles with regard to headlap, with the tops of the cut-outs being used as ersatz headlap alignment marks, this only works well when the shingle is cut short and a terminal end thereof happens to align with a cut-out. Furthermore, manufacturers often specify different headlap requirements that do not correspond to the tops of the cut-outs; these requirements tend to be ignored by installers in favor of aligning the shingles to the cut-outs, which, in practice, is easier than measuring and marking each shingle. Lastly, because three-tab shingles comprise only a single layer, there is no existing horizontal line created during their construction that could be used for alignment, as is the case with architectural shingles.

In addition to the above issues, one of the more difficult aspects of laying out a roof is properly laying shingles in valleys. Current practice involves measuring where shingles are to be laid and placing marks from rake to rake and, before the valley, and snapping a chalk line between the marks and into the valley itself, so as to provide for proper shingle reveal and alignment. This measurement is time consuming, prone to error and requires additional tools to be hauled onto the roof.

What is needed, therefore, are products and techniques for providing better direction to installers and enabling more consistent, stronger and more aesthetically pleasing installation of asphalt roofing shingles, especially in large open field areas, without the use of measurement devices currently necessary, while allowing for roofing shingles to be applied around areas requiring additional work, such that a minimum of un-shingled roof is exposed while waiting for work on the area to be completed.

SUMMARY OF THE INVENTION

One embodiment of the present invention provides an asphalt roofing shingle, adapted to be laid up in courses on a roof, comprising: an upper headlap portion, a lower tab portion, vertically spaced apart upper and lower edges, laterally spaced apart parallel right and left edges and top and bottom surfaces; wherein the bottom surface is configured to be laid up on a roof facing the roof; wherein the tab portion of the top surface is configured to be substantially weather-exposed when laid up on a roof and wherein the upper headlap portion is configured to be substantially covered by the tab portion of roofing elements in a next-overlying course of roofing elements when laid up on a roof; and wherein the upper headlap portion further comprises a plurality of parallel, vertical, first markings, the first markings being uniformly laterally spaced from the left edge of the shingle to the right edge thereof, thereby creating a uniform lateral spacing between first markings, the first markings vertically extending from the upper edge of the shingle to substantially adjacent the lower tab portion, the first markings being useful, at least, for enabling an installer to square shingles to one another, aligning adjacent shingles in a uniform manner, cutting books of shingles, forming starter shingles from full shingles and forming a grid of shingles without requiring the use of external measuring devices.

Another embodiment of the present invention provides such a shingle wherein the uniform lateral spacing between first markings is equal to a side lap measurement and corresponds to the field shingle exposure recommended for the shingle, wherein the first marking proximal the left edge of the shingle is positioned at the recommended side lap measurement from a left edge of the shingle and the first marking distal the left edge of the shingle corresponds with the right edge of the shingle.

A further embodiment of the present invention provides such a shingle wherein the first marking proximal the left edge of the shingle is positioned approximately 2" from the left edge of the shingle, each consecutively more distal marking being a distance equal to a recommended side lap measurement of 5⅝" from the preceding marking, the shingle being 39⅜" in length and 13¼" in height.

Yet another embodiment of the present invention provides such a shingle wherein the shingle is an architectural type shingle and wherein the first markings extend substantially from an uppermost portion of the upper headlap portion through a lowermost portion of the lower tab portion and are positioned in single-thick areas of the architectural shingle.

A yet further embodiment of the present invention provides such a shingle further comprising at least one adhesive strip disposed on the top surface and running parallel to the upper edge of the upper headlap portion.

Still another embodiment of the present invention provides such a shingle further comprising two adhesive strips disposed on the top surface and running parallel to the upper edge of the upper headlap portion, each strip positioned on substantially opposite ends of the upper headlap portion of the top surface.

A still further embodiment of the present invention provides such a shingle further comprising a second, horizontally-oriented, marking extending along the interface between the upper headlap portion and the lower tab portion, the second marking, in conjunction with the first markings being useful, at least, for aligning adjacent shingles, cutting books of shingles, forming starter shingles from full shingles and forming a grid of shingles without external measuring devices.

Even another embodiment of the present invention provides such a shingle wherein the shingle is structurally weakened along the second marking, enabling the shingle to be readily divided along the second marking and used as a rake or eave starter shingle.

An even further embodiment of the present invention provides such a shingle wherein the first and second markings comprise dots, indentations, perforations, cuts and/or lines.

A still even another embodiment of the present invention provides such a shingle wherein at least one of the first and second markings is visible on the back side of the shingle.

A still even further embodiment of the present invention provides such a shingle wherein the shingle is 39⅜" in length, 13¼" in width, has recommended rake and side lap measurements of 5⅝", and comprises 6 first markings, the first marking positioned 5⅝" from the left edge of the shingle with each consecutive marking spaced 5⅝" from the preceding marking.

Still yet another embodiment of the present invention provides such a shingle wherein the shingle is provided in a continuous roll form.

A still yet further embodiment of the present invention provides such a shingle wherein the marks placed on the shingle provide for specific nail placement through the use of nail placement marks.

Even yet another embodiment of the present invention provides such a shingle wherein, on a backside of the shingle, the marks extend vertically from a top portion of the shingle to a bottom portion of the shingle.

One embodiment of the present invention provides an asphalt starter shingle comprising: vertically spaced apart upper and lower edges, laterally spaced apart right and left edges and top and bottom surfaces; wherein the bottom surface is configured to be laid up on a roof facing the roof; the starter shingle further comprising a plurality of parallel, evenly laterally spaced markings, wherein the markings are useful for alignment purposes; and further comprising at least one adhesive strip disposed on the top surface and running parallel to the upper and lower edges of the shingle.

Another embodiment of the present invention provides such an asphalt starter shingle wherein the starter shingle is provided in a continuous roll form.

A further embodiment of the present invention provides such an asphalt starter shingle wherein the spacing between the plurality of parallel, evenly laterally spaced markings is equal to a recommended side lap measurement, thereby allowing an installer to create a series of vertical lines across a roof to be shingled, and position courses of field shingles with appropriate side lap based on those vertical lines, without the use of measuring devices by running the claimed starter shingle horizontally across the eave of the roof and extending those markings through the use of a marking device, such as a chalk snap line, to the ridge of the roof.

Yet another embodiment of the present invention provides such an asphalt starter shingle wherein the spacing between the plurality of parallel, evenly laterally spaced markings is equal to a recommended head lap measurement, thereby allowing an installer to create a series of horizontal lines across a roof to be shingled, and position courses of field shingles with appropriate shingle reveal based on those horizontal lines, without the use of measuring devices by running the claimed starter shingle vertically up opposing rakes of the roof and connecting corresponding markings through the use of a marking device, such as a chalk snap line.

One embodiment of the present invention provides a method of roofing around roof protrusions using the starter shingle previously described comprising: adjacent roof protrusions that protrude substantially perpendicularly from a roof, such as dormers, skylights, chimneys, cheek walls, and the like, applying the starter shingle adjacent the portions of such roof protrusions that extend substantially vertically between the eave and ridge of the roof and are substantially parallel to the rake edges of the roof, thereby creating a raised area near those protrusions that encourages moisture to run away from such protrusions into the field of the roof, where it is less likely to penetrate into the structure being roofed while providing markings useful for shingle alignment.

Another embodiment of the present invention provides such a method wherein the markings of the starter shingle are spaced apart a distance that corresponds to a recommended head lap reveal and wherein such shingles are further applied along opposing rake edges of the roof, creating a grid across the roof without the use of further measuring devices that is then continued after the roof protrusion by the shingles as previously described.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 17 is a top elevation view of a three tab shingle having notches for creating books of shingles and alignment, in accordance with embodiments of the present disclosure;

DETAILED DESCRIPTION

The present disclosure provides an asphalt shingle 100 and method of using such a shingle 100 to facilitate protection of a structure from the elements. Specifically, the shingles 100 and methods disclosed herein allow for easy and accurate installation on conventional structures through the use of clear markings placed on portions of the shingles 100 which are hidden from view after installation. These shingles 100 aid the applicator installing the roof 102 by eliminating steps and tools currently required to perform such an installation. Also, by placing marks directly on the shingle 100, the manufacturer can ensure that its installation requirements are clearly conveyed and deviations from the manufacturer's specifications will be clearly visible to foremen and others responsible for monitoring the quality of an installation.

Figure 1:
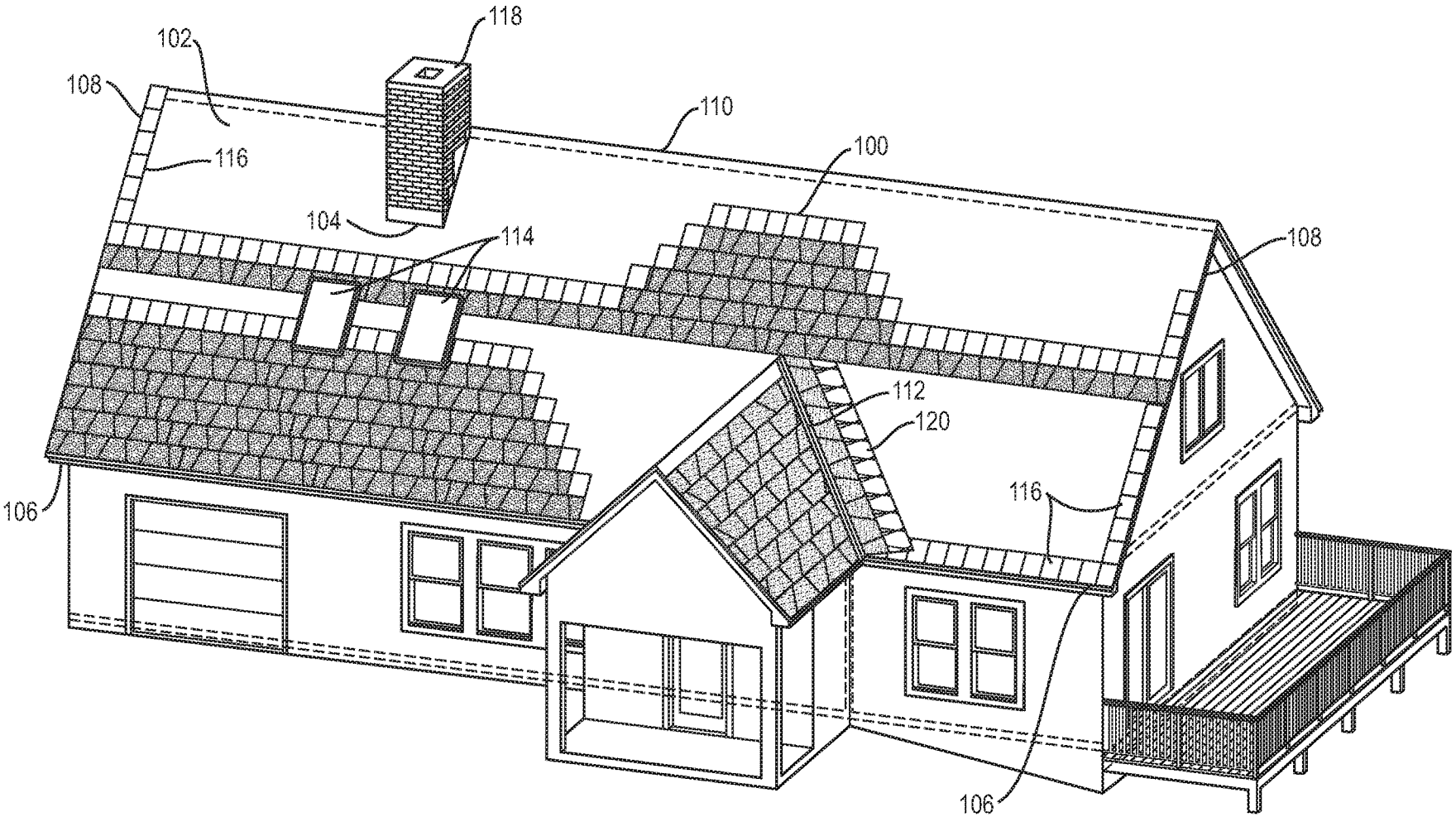
FIG. 1 is a front, top left-side perspective view of a home showing the various roofing structures discussed throughout this disclosure and further illustrating shingles in accordance with embodiments of the present disclosure partially installed around a roof protrusion.

Now referring to FIG. 1, a roof is shown with shingles 100 in accordance with embodiments of the present invention partially installed. FIG. 1 shows roofing structures and consumables, such as headwalls 104, eaves 106, rakes 108, side walls, a ridge or peak 110, a valley 112 and skylights 114 which are used throughout the present disclosure.

Shingles 100 in accordance with embodiments of the present disclosure allow for a fast, accurate and calculation-free layout method through all phases of roof 102 installation by assisting the installer in maintaining a square, grid, pattern through completion with minimal or no use of external or additional products or methods, as required today.

When using starter and field shingles 100 in accordance with embodiments of the present invention, manual measuring, marking, placing of tapes and snapping of lines may be eliminated. Instead, by placing such markings directly onto the shingles 100, manufacturer controls are introduced into the installation process, enhancing the likelihood of a warranty worthy roof, while ensuring an aesthetically pleasing roof for the owner.

In recent years, the roofing industry has adopted laminate shingles 100 as the predominant shingle 100 installed today. Laminate shingles 100 are actually two separate shingles 100. These shingles 100 are laminated together to make one extra thick shingle 100. The horizontal line created by the interface of the two shingles 100 creates an initial straight line, which may be used to align shingles 100, but is not sufficient to enable precise alignment. This line will now be referred to as the horizontal alignment mark 200.

Figure 13:
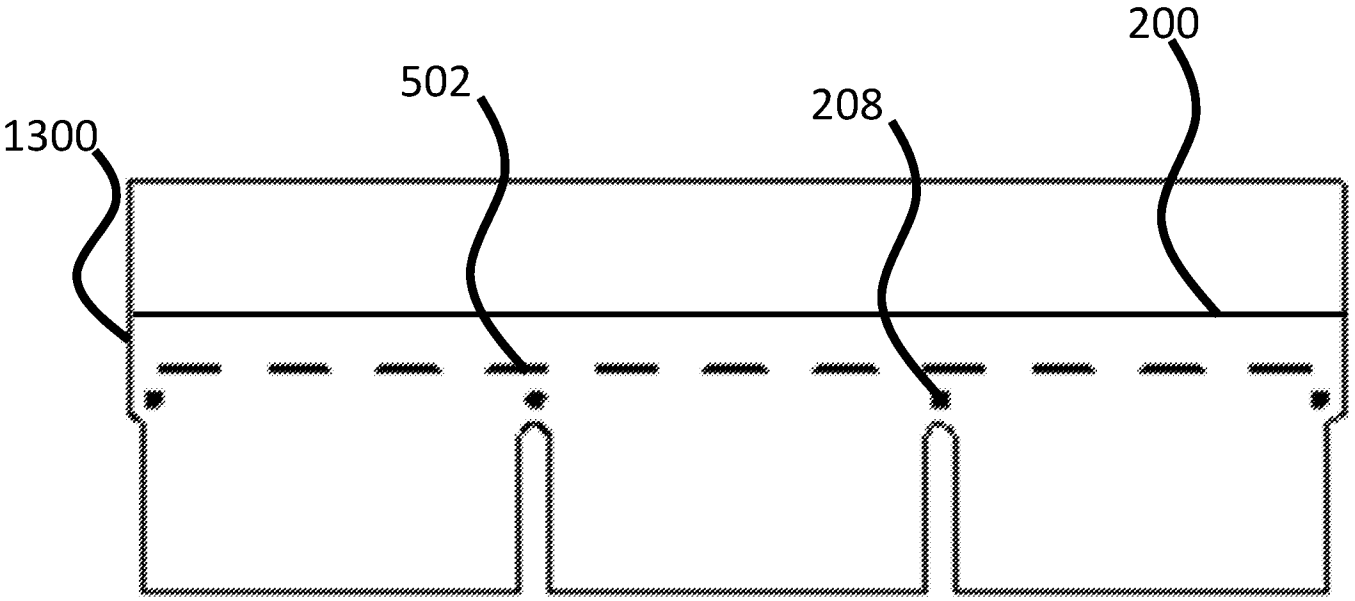
FIG. 13 is a top elevation view of a three tab shingle in accordance with embodiments of the present disclosure.
Figure 14:
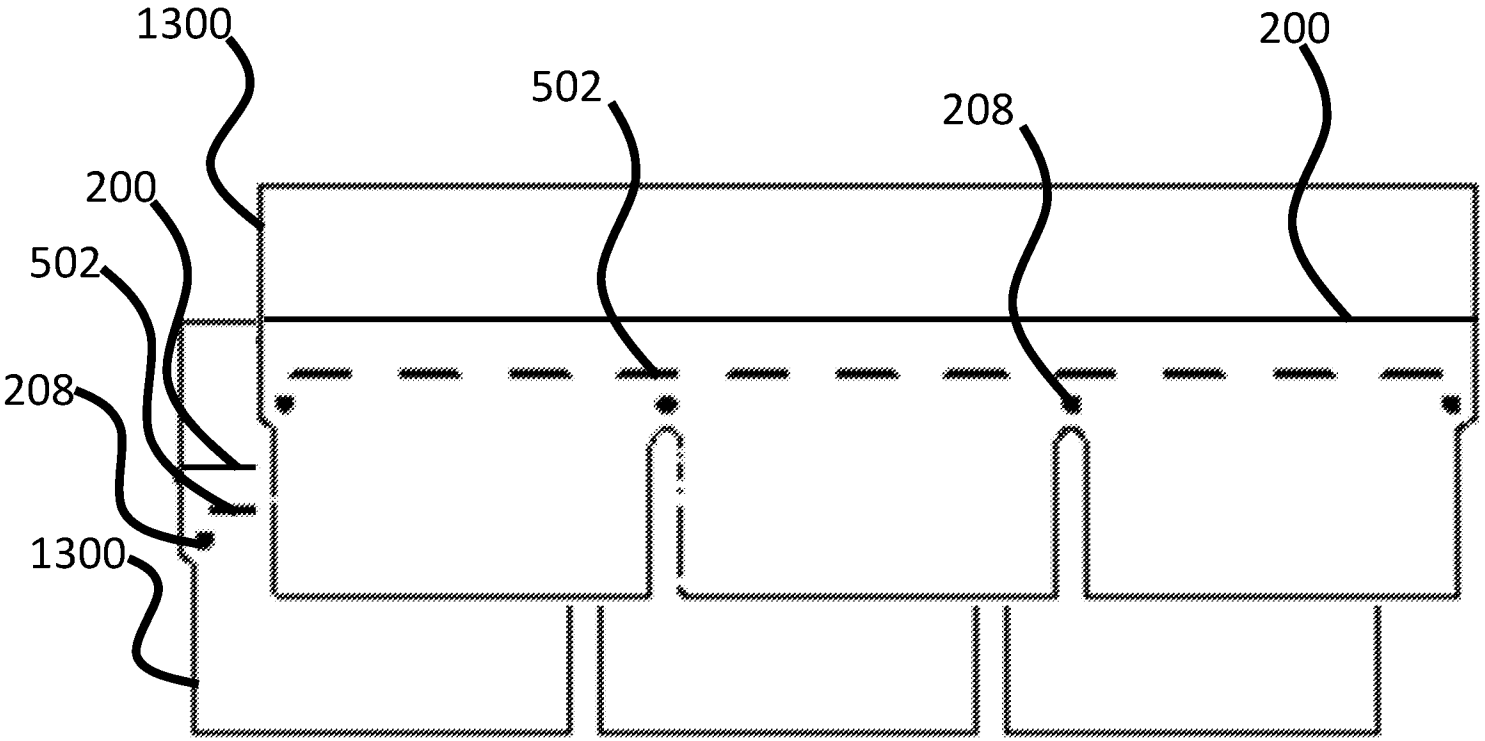
FIG. 14 is a top elevation view of two three tab shingles showing how adjacent courses of such shingles would be laid up on a roof, in accordance with embodiments of the present disclosure.

While laminate shingles 100 are the most frequently-encountered type of shingle today, three-tab, single layer thick shingles 1300, such as that shown in FIG. 13 (shown individually) and FIG. 14 (showing two shingles from adjacent courses, as they would be laid-up on a roof), remain a cost-effective alternative and are still in common use. In embodiments involving the use of three-tab shingles 1300, a horizontal alignment mark 200 may be added to the three-tab shingle 200, with the mark being positioned either above, below, or on the adhesive strip 502, i.e. in the headlap region 202, to achieve the desired overlap, with the horizontal alignment mark 200 being used to mark the recommended overlap between adjacent courses, with a topmost portion (a factory-cut, straight edge) of a three-tab shingle 1300 in an adjacent course being aligned with the horizontal alignment mark 200 during installation.

Figure 20:
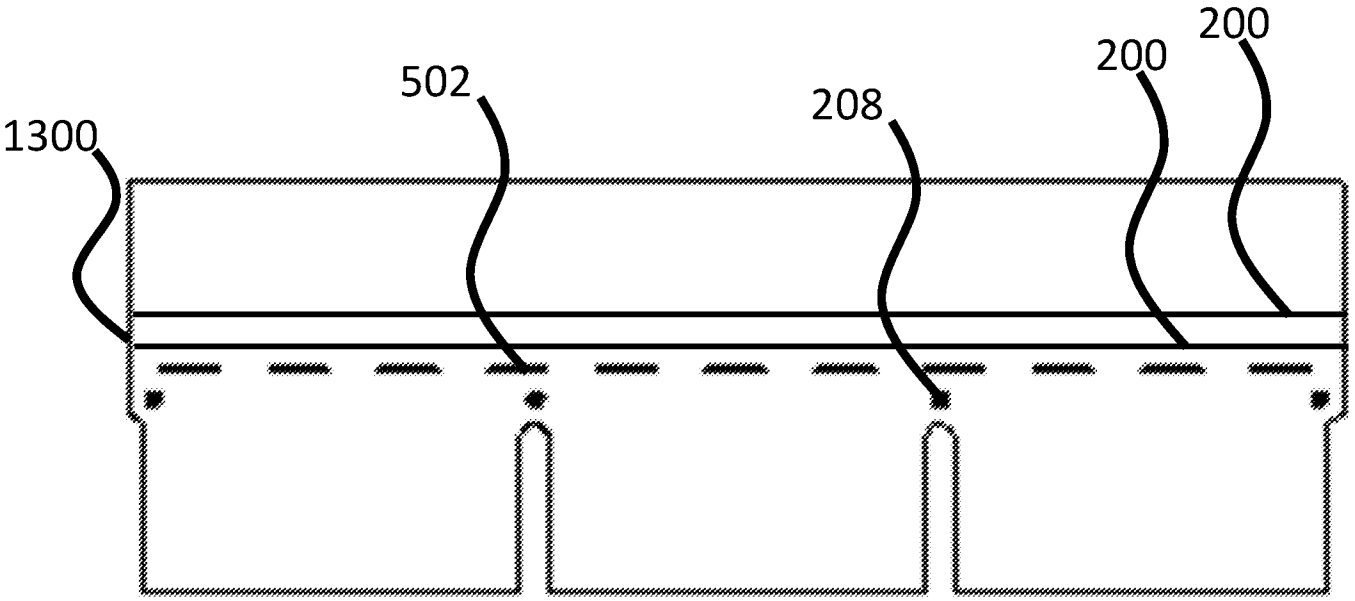
FIG. 20 is a is a top elevation view of a three tab shingle having multiple horizontal alignment marks, in accordance with embodiments of the present disclosure.

In embodiments, such as that shown in FIG. 20, multiple horizontal alignment marks 200 may be used to provide the installer various options for headlap, where appropriate.

In embodiments, gaps in the horizontal alignment mark(s) 200 that correspond with the cutouts present in three tab shingles 1300 are provided.

In embodiments, the cuts in the right and left edges of the shingle 100 that align with the horizontal alignment mark(s) 200 are provided, allowing the shingle 100 to be separated into upper and lower sections, allowing it to be used as a starter shingle.

In embodiments, the horizontal alignment mark(s) 200 are temporary, being formed in such a way that they will dissipate over time, allowing them to be used for alignment in a way that prevents them from being covered during installation without remaining visible for the life of the roof.

Since the horizontal alignment mark(s) 200 allow for shingle alignment without utilizing the cut-outs present on three tab shingles 1300, the cut-outs may be made larger than normal without affecting the ease of their installation.

Figure 15:
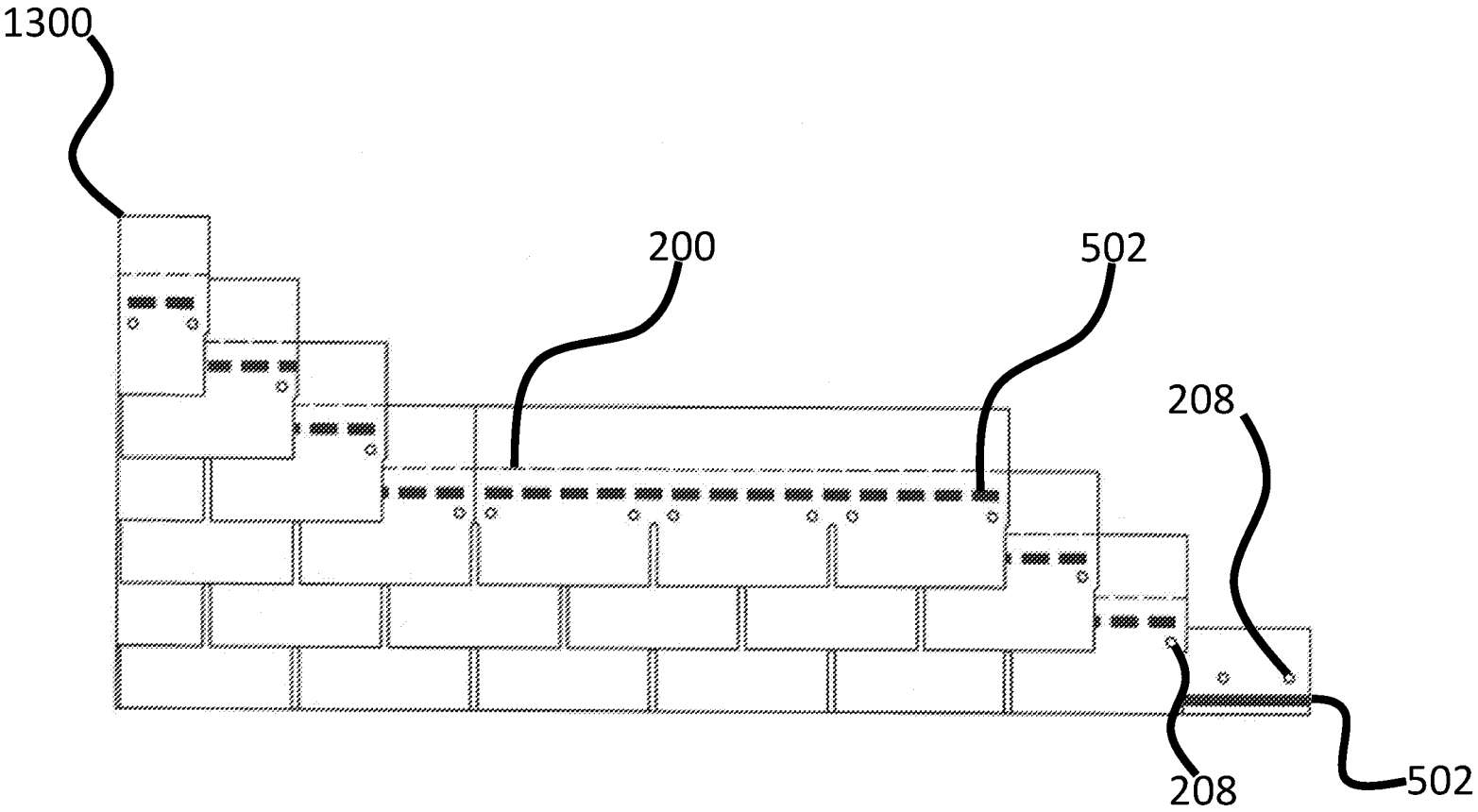
FIG. 15 is a top elevation view of several courses of three tab shingles showing how adjacent courses of such shingles would be laid up on a roof, in accordance with embodiments of the present disclosure.
Figure 16:
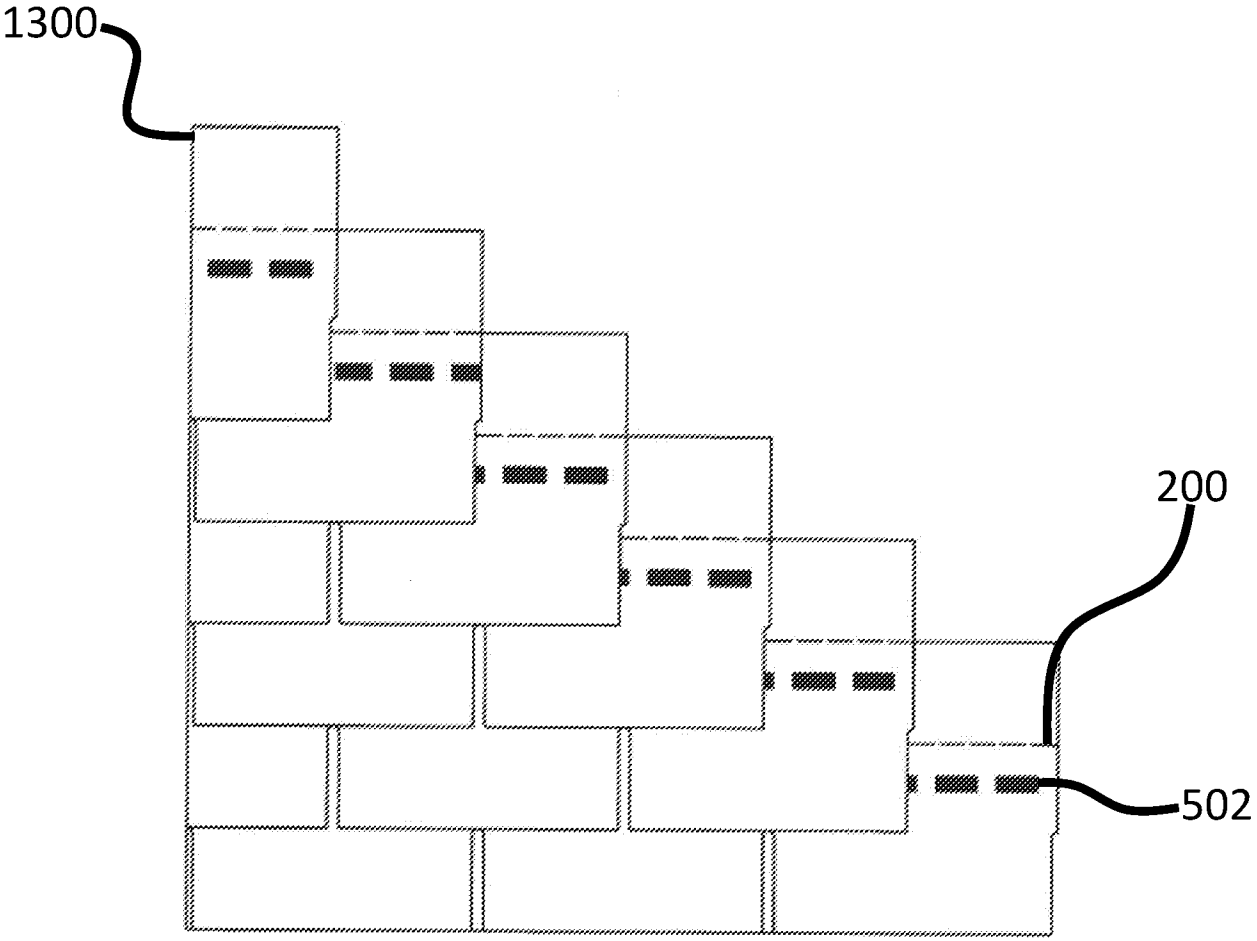
FIG. 16 is a top elevation view of several courses of three tab shingles showing how adjacent courses of such shingles would be laid up on a roof, in accordance with embodiments of the present disclosure.

Now referring to FIGS. 15 and 16, three tab shingles 1300 in accordance with embodiments are shown in multiple courses, as they would appear on a roof, showing the alignment thereof.

Now referring to FIG. 17, a three tab shingle 1300 having notches 1700 in an upper edge thereof is shown. These notches allow an installer to cut the shingle 100 into multiple sections for book creation and can also assist the installer with shingle 100 alignment.

Figure 18:
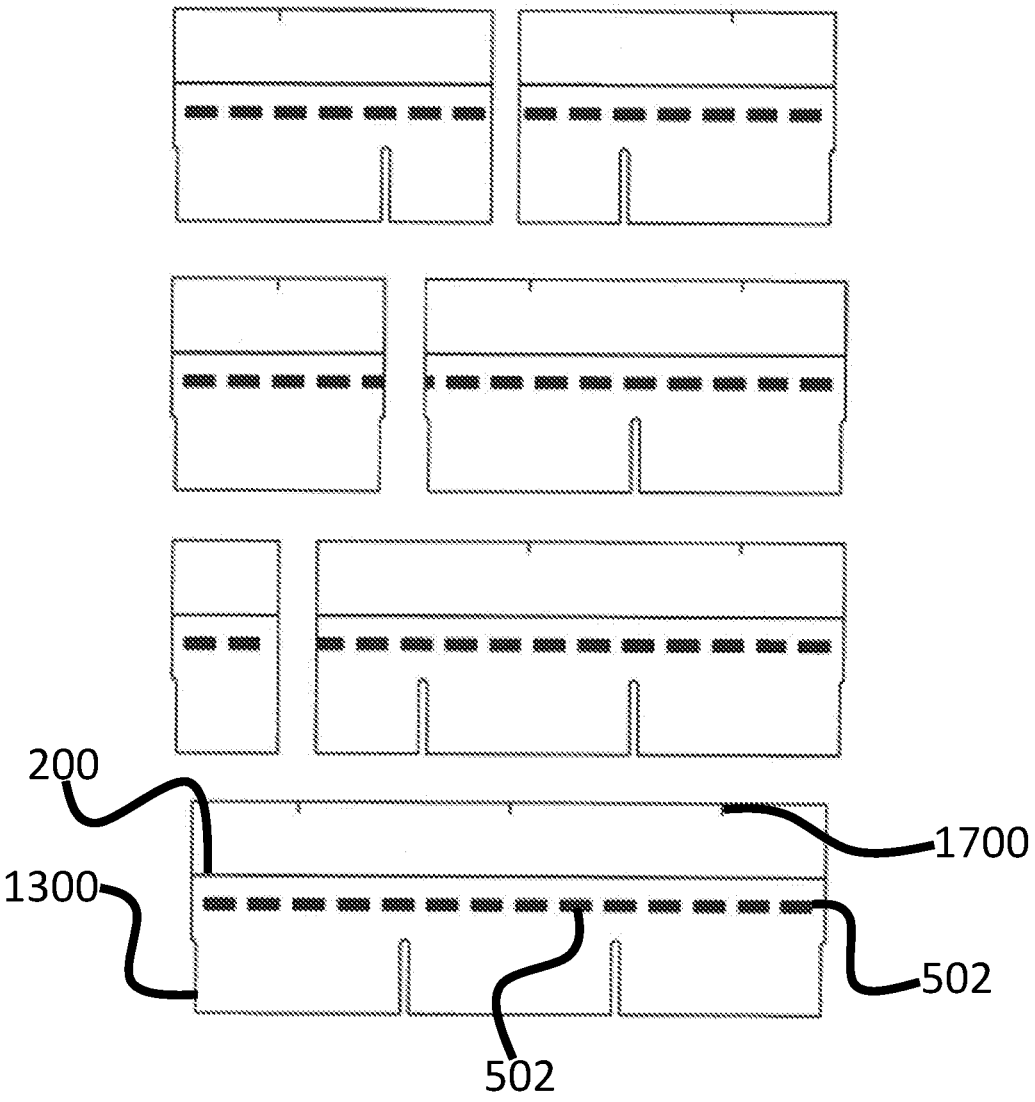
FIG. 18 is a top elevation view of the three tab shingle of Figure showing multiple configurations thereof, in accordance with embodiments of the present disclosure.

Now referring to FIG. 18, the three tab shingle 1300 having notches 1700 in an upper edge thereof of FIG. 17 is shown divided into various smaller sections of shingle 100, as it might be cut to create a book of such shingles 100. These notches allow an installer to cut the shingle into multiple sections for book creation and can also assist the installer with shingle alignment.

Figure 19:
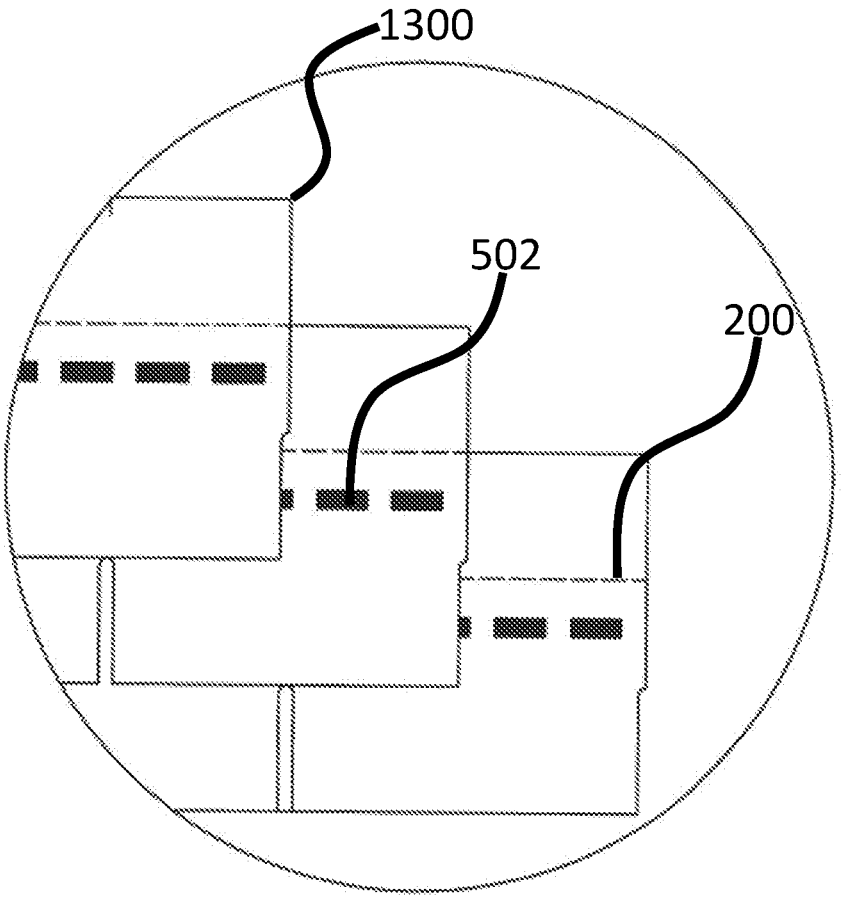
FIG. 19 is a close-up, top elevation view of the three tab shingle of FIG. 17, in accordance with embodiments of the present disclosure.

Now referring to FIG. 19, the three tab shingle 1300 having notches 1700 in an upper edge thereof of FIGS. 17 and 18 is shown as it might be laid up in courses on a roof.

Now referring to FIG. 20, a three tab shingle 1300 having multiple horizontal alignment marks 200 is shown. These multiple alignment marks can be used, inter alia, to allow an installer to pick between different suitable headlap measurements when constructing the roof.

In embodiments, the horizontal alignment mark 200 may also be used to square the shingle 100 to the ridge.

Typical shingle application begins with proper preparation of the roof deck 102, through application of underlayment and other barriers and treatments, as necessary. After properly preparing the roof deck 102, a drip edge is typically installed to both the rake 108 and eave 106 of the roof 102.

After installing the drip edge, a starter shingle 116 is placed on top of the drip edge, typically at the intersection of rake 108 and eave 106 locations, which provide a square on which to align the shingle 100.

The rake starter shingle 116 is typically installed first. After installation of the rake starter shingle, an eave starter shingle 116 is abutted to the rake starter shingle 116 and may even be placed into a partially or fully overlapping relationship therewith, so as to maximize adhesion. Both the eave and rake starter shingles 116, in embodiments may be the removed headlap portion 202 of embodiments of the present disclosure having a horizontal alignment mark 200 separation distance of approximately half of the height of the shingle 100. Such a starter shingle 116 may be created by cutting a full field shingle 100 in accordance with embodiments of the present invention on the single thick portion of the laminate shingle 100 just above the horizontal alignment mark 200.

Alternatively, the eave starter shingle 116 may be installed first. In such an installation, the portion of the eave starter shingle 116 adjacent the rake 108 is typically not fastened, permitting for the insertion of a rake starter shingle 116. The rake starter shingle 116 may then be inserted into the interface of the full field shingle 100 and the eave starter shingle 116. One of the vertical alignment marks 204 on the rake starter shingle 116 may then be aligned so as to terminate exactly at the top of the field shingle 100 (in embodiments, the second vertical alignment mark 204).

After rake and eave starter shingles are installed, a full shingle 100 may be placed over the starter courses and installed flush with the eave 106 and rake 108 starter shingles 116. This process of installing full shingles 100 continues across the entire roof 102. After the first shingles 100 are installed, it may be desirable, although entirely optional, to snap a single line to adjust for any variable in terms of a straight line found at the eave 106.

Next, successive field shingles 100 cut to successively shorter lengths may be installed above and in partially overlapping relationship with the previous shingle 100, forming a pyramid, or staggered, pattern, which is also known as a book of shingles 300. Conveniently, these lengths may be cut and the cut shingles 100 aligned on the provided vertical alignment marks 204, reducing the possibility of user error and requiring no measuring devices.

The overlapped portion of the shingle is the headlap region 202. This process of installing the shingles 100 in a partially overlapping relationship insures that the gaps between adjacent rows of shingles 100 do not align in the field section of the roof 102, which could result in leaks. The placement of one straight line may be required when starting at the eave 106 so as to insure that the roof will be squarely installed. Although this step should not generally be required, fasciae may not always be perfectly installed and it is a best practice to not rely on them when squaring starter shingles 116 on which the square-ness of the remainder of the roof 102 will depend.

The shingles 100 obtained by cutting field shingles to successively shorter lengths are referred to as books 300. These books 300 are installed as previously described up the rake 108 of the roof 102, beginning at the eave 106-rake 108 intersection. The size of the books 300 may vary, due, at least in part, to differing manufacturer specifications regarding side lap requirements, reveals and fastening patterns.

Additionally, a consistent overhang of the shingle 100 past the drip edge may be used to create an additional architectural detail and to aid in moving water away from the building envelope. Typically, installation begins at the left side of the roof 102, as most applicators are right handed, leaving the applicators strong hand exposed to the rake 108 needing to be cut upon completion of the roof 102.

Also notable, shingles 100 often have instructions on the exterior packaging detailing book 300 creation and other information critical to their proper installation. Despite such instructions, when it comes to creating books 300, applicators tend to cut the shingle 100 at the place of least resistance, which, on a laminate shingle 100, tends to be where it is single thick, forcing manufacturers to permit for variables when it comes to nail placement.

Figure 2:
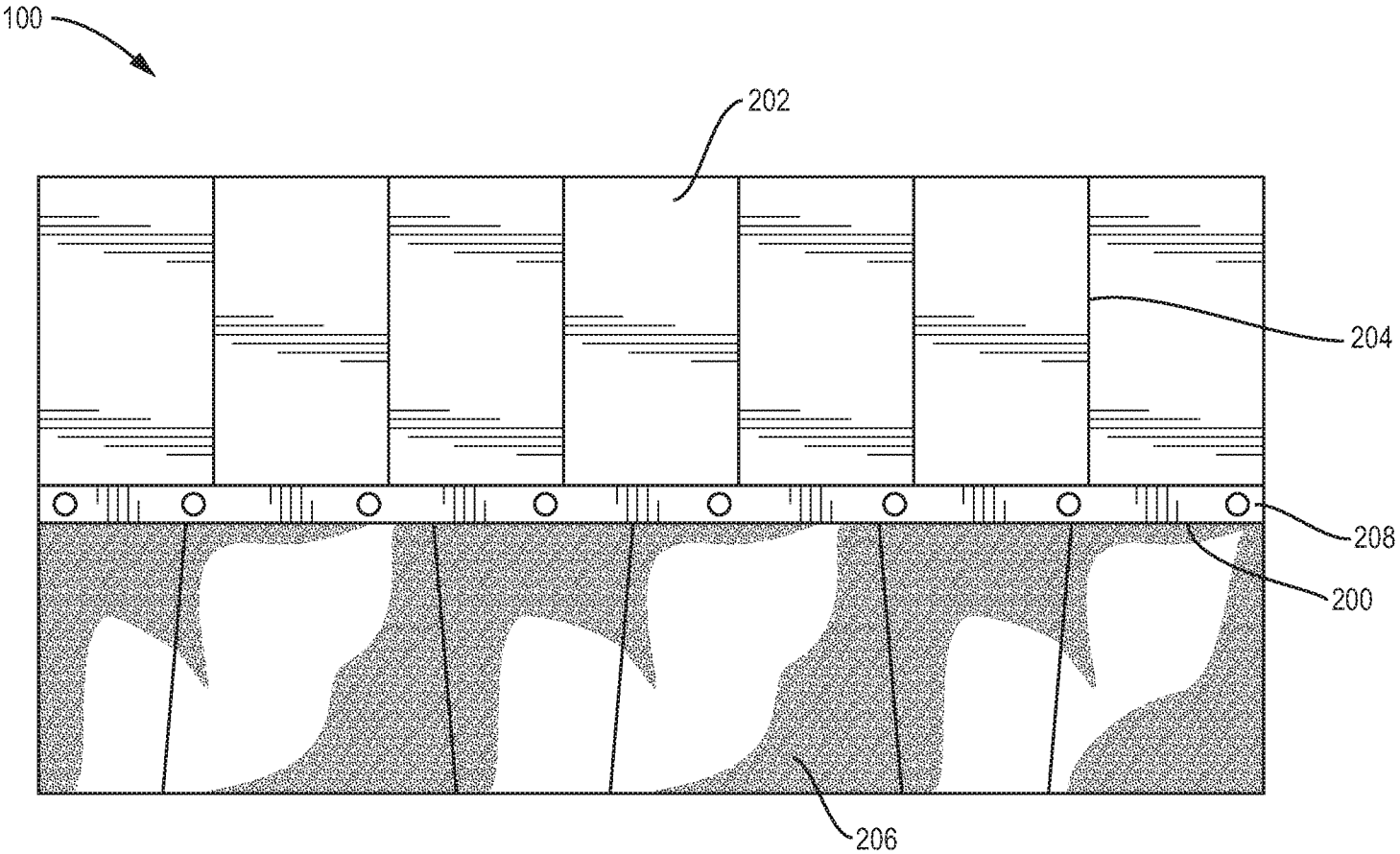
FIG. 2 is a front elevation view illustrating a shingle configured in accordance with one embodiment of the present invention.
Figure 3:
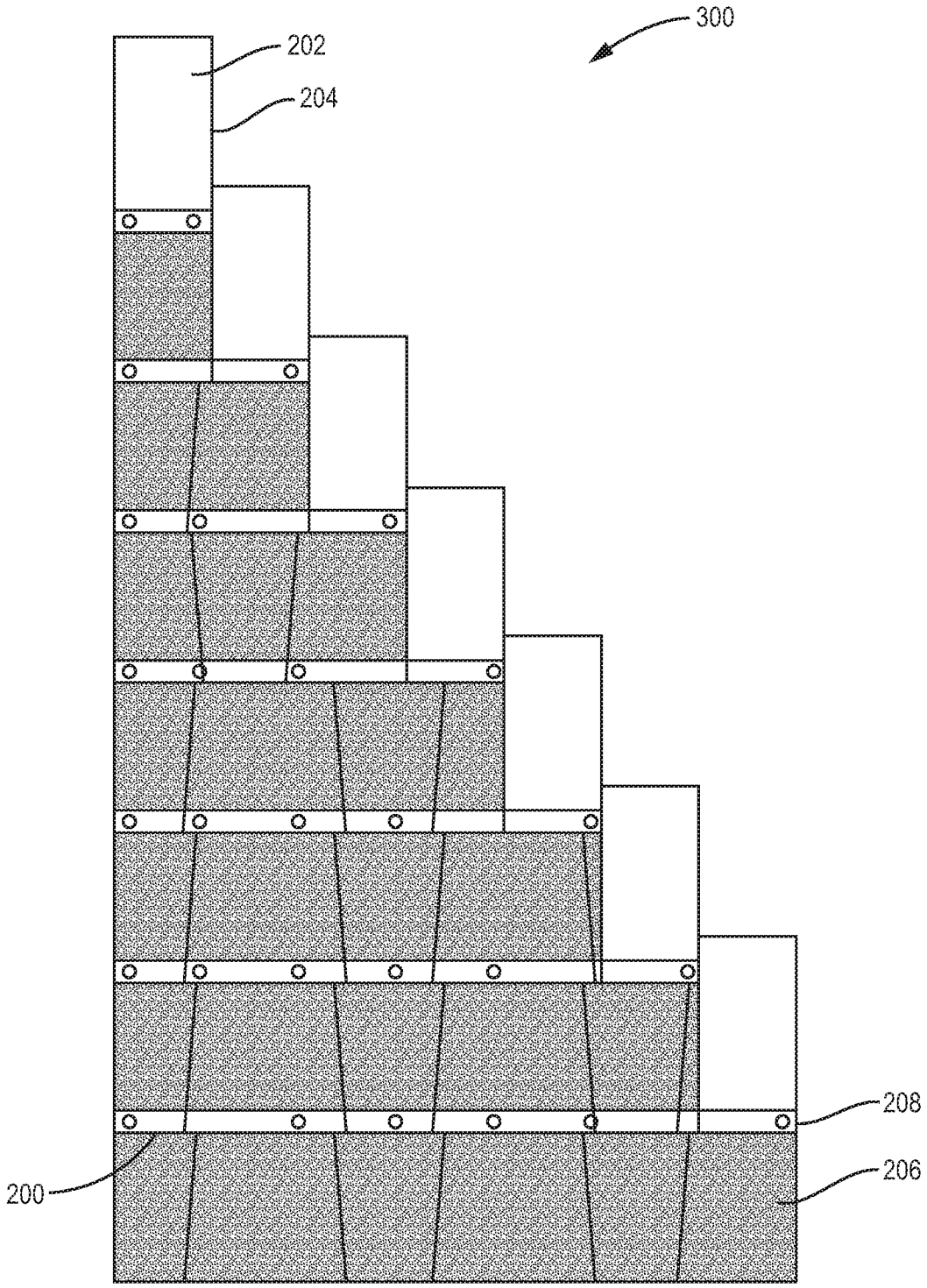
FIG. 3 is a front elevation view illustrating a shingle configured into a book of shingles, in accordance with one embodiment of the present invention.
Figure 4:
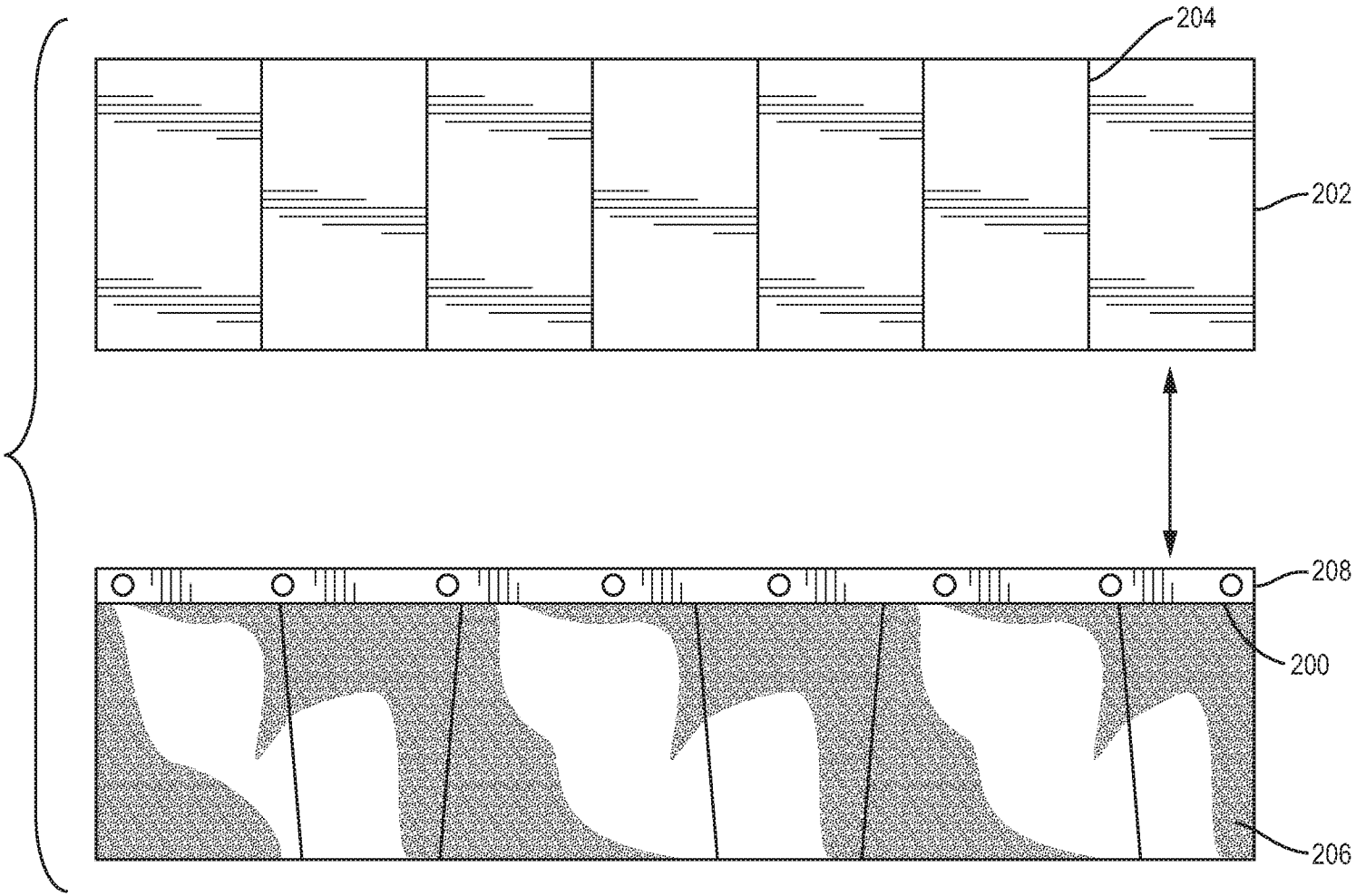
FIG. 4 is a front elevation view illustrating a shingle separated into a starter shingle and a nail strip and shingle, in accordance with one embodiment of the present invention.

Now referring to FIGS. 2-4, an embodiment of a shingle 100 according to the present disclosure, designed to facilitate a quick and clear method of meeting manufacturer requirements for shingle 100 reveal, nail placement and side lap requirements, is shown. The shingle 100 contains a series of evenly spaced, parallel, vertical alignment marks 204, oriented perpendicularly to the length of the shingle 100. These marks are positioned on the headlap region 202 of the shingle 100, which is designed to be covered by a shingle 100 in a higher adjacent row after installation.

These vertical alignment marks 204 may be used to facilitate the creation of books of shingle 300 and during installation to ensure accuracy without the use of external measuring devices. These vertical alignment marks 204 both make clear the proper locations for shortening the shingle 100 for book 300 creation while aiding the applicator during placement by providing, in conjunction with a horizontal alignment mark 200 or the interface between the headlap 202 and tab 206 portions of a laminate shingle 100, a built in square to base further shingle 100 placement on. This allows a grid to be formed on the roof 102 solely through the use of the shingles 100 themselves.

The horizontal alignment mark 200, in embodiments, divides the shingle 100 roughly in half along its height, the horizontal alignment mark 200 running the length of the shingle 100. As will become apparent, these series of marks will eliminate steps and equipment now required, while providing for proper shingle 100 reveals, stagger and nail placement. The horizontal alignment mark 200 and vertical alignment marks 204 are the references used when installing field shingles 100 in accordance with embodiments of the present disclosure.

Through the use of such a shingle 100, layout tools and measuring devices typically used in such installations are obviated since the shingles 100 themselves incorporate all of the tools required for proper book 300 creation and shingle 100 layout. In asphalt shingle roofing in particular, this disclosure is particularly helpful as these shingles 100 typically abut the preceding shingle 100, allowing precise grid formation without measuring devices typically used.

A further advantage of a uniform grid layout for shingle 100 installation, as enabled by the current disclosure, is that it permits the installer to work around areas on a roof 102 such as vent boots, dormers, chimneys 118, skylights 114 and other areas in need of additional work prior to being roofed, such as areas having substrate rot. Such areas may be revisited at a later time, after the situation has been addressed, allowing installation to proceed without delay. Through proper use of the shingle 100 of the current disclosure, the area skipped can be readily completed and filled in at a later date, without dealing with partial shingles 100.

In short, the horizontal alignment marks 200 and vertical alignment marks 204 permit for going around such an area, and quickly being able to fill in the void at a later time, while increasing efficiency and limiting the number of cuts and product required when filling in such an area.

Using the vertical alignment marks 204, the installer may align a first end of a full size field shingle 100 with one of the vertical alignment marks 204 of a previously positioned field shingle 100, allowing the installer to easily ensure the correct fit of field shingles installed at a later date.

Figure 5:
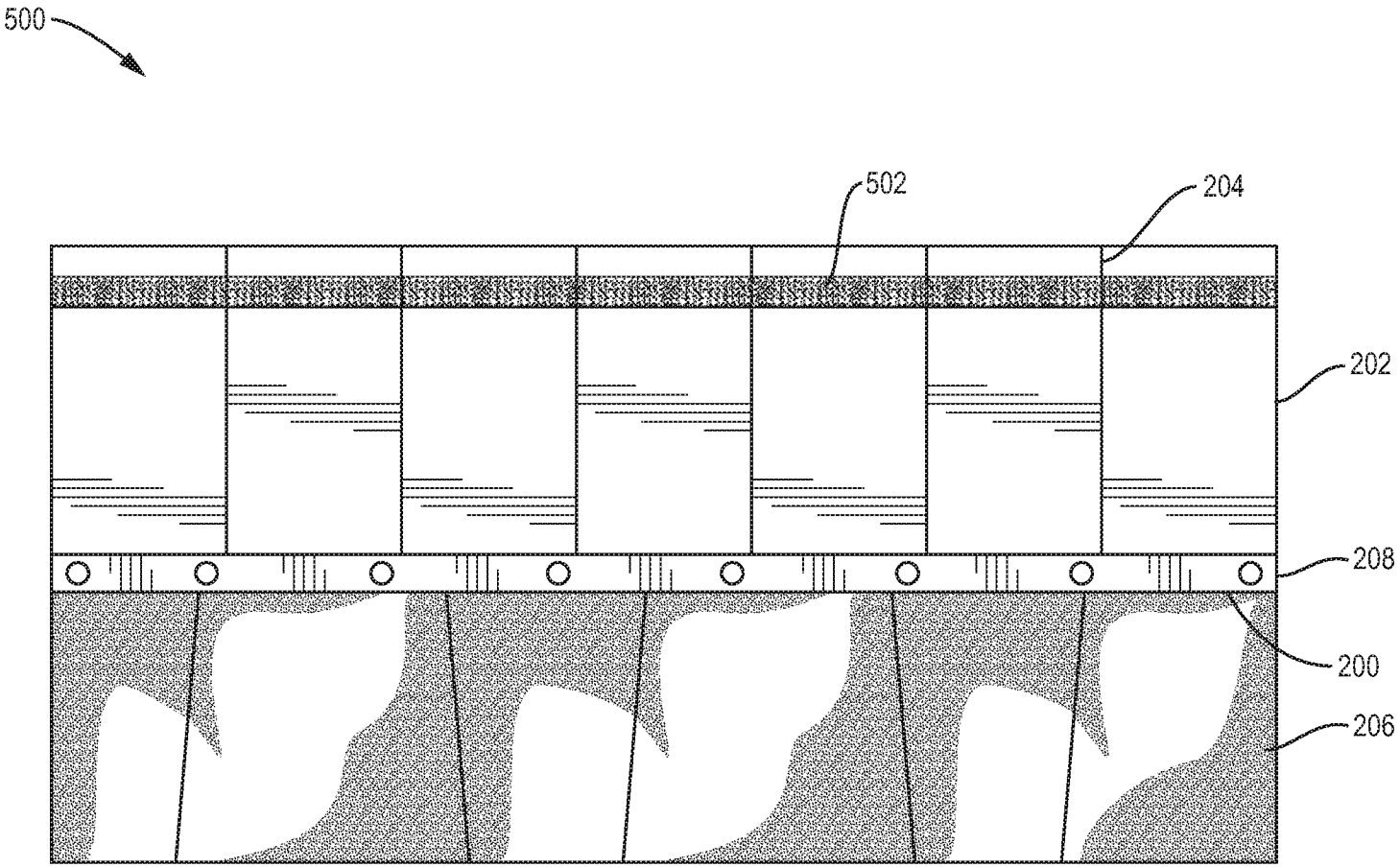
FIG. 5 is a front elevation view illustrating a shingle with a strip of adhesive laid thereon, in accordance with one embodiment of the present invention.

Now referring to FIG. 5, an embodiment of the present disclosure, a convertible field/starter shingle 500 is shown. Although previously described embodiments may also be used in this manner, the adhesive strip 502 in this embodiment's headlap region 202 makes it especially well-suited for this task. In this embodiment, the upper portion of the shingle 202 may be removed from the lower portion of the shingle 206, typically at the horizontal alignment mark 200. After removing the lower portion of the shingle 206, the upper portion can be used as a starter shingle 116 at a rake 108, eave 106 or other location. These starter shingles 116, when installed up the rake 108 of the roof 102 and along the eave 106 of the roof 102, aid in placement of adjacent shingles 100, helping to ensure proper butt end reveals and general square-ness of the installation.

As an illustrative example, asphalt shingles 100 typically come in Metric and English sizes. One example of a metric size shingle 100 is the Timberline shingle, as manufactured by GAF, 1 Campus Drive, Parsippany, N.J. 07054. The Timberline shingle measures 39⅜" (1M) long and 13¼" (337 mm) wide and may be adapted to take advantage of the current disclosure, though any asphalt shingle 100 could benefit from the current disclosure.

In embodiments, a plurality of vertical alignment marks 204 are located in the headlap region 202 of the shingle 100, evenly spaced apart at a distance of approximately half of the height of the shingle 100 itself and parallel to one another and perpendicular to a horizontal alignment mark 200, which runs the length of the shingle 100. In further embodiments, the width of a shingle 100 in accordance with the present invention is evenly divisible by half of its height and vertical alignment marks 204 are spaced apart by a distance equal to half of the shingle's 100 height, allowing for the abutment regions between adjacent shingles 100 to be used as vertical alignment marks 204.

To illustrate the concept described, using the Timberline shingle 100 described above, in accordance with embodiments of the present disclosure, six vertical alignment marks 204 could be placed in a headlap region 202 at 5⅝", 11¼", 16⅞", 22½", 28⅛" and 33¾". This arrangement would allow the final vertical alignment mark 204 to be the distal edge of the shingle 100, or, more generally, the abutment region between the shingle 100 and an adjacent shingle 100, and the starting vertical alignment mark 204 to be the proximal end of the shingle, or the abutment region between this and a previously installed shingle. The shingle 100 would have a height of 13¼" and a horizontal alignment mark 200 at 5⅝" high, running the length of the shingle 100.

The positioning of vertical alignment marks 204 in this manner allows for the headlap portion 202 to be removed, in embodiments, for use as a starter shingle 116 on a rake edge 108 as well as on eaves 106. A single or multiple strips of adhesive 5, which may be continuous or intermittent, may be laid on either the upper or lower portion of the headlap region 202 or both. Where multiple adhesive strips 502 are used, they should typically be parallel to one another. Such adhesive strips 502 allow installers to use the headlap region 202 of a full shingle 100 as a starter shingle while maintaining the benefits of adhesive strips 502 commonly used only on starter shingles 116. If the shingle 100 is used as a field shingle 100, the adhesive 502 will provide an increase in strength in that area.

As to nail placement, on a full shingle 100, between four and six nails are typically used. In the embodiment described above, nails may be placed using the vertical alignment marks 204 as a guide; nails being placed into the shingle nail zone 208, above the horizontal alignment mark 200 using the vertical alignment marks 204 and the horizontal alignment mark 200 as a guide. Although normal construction best practices must continue to be observed, namely the omission of nails from a certain distance from the edge of a shingle, the vertical alignment marks 204 provide for uniform spacing and greater installed strength as long as the installer avoids placement of nails on marks too near the edge of the shingle 100.

On book 300 or starter block shingles, nail placement can vary depending on the size of the shingle 100 being installed in an overlapping relationship thereon. In embodiments of the present disclosure, the determining factor becomes the vertical alignment marks 204 placed on the headlap region 202 of the shingle 100. Where a vertical alignment mark 204 of an underlying shingle 100 can be seen, due to the termination of a shingle 100 placed onto the lower shingle 100 no fastener should be installed to the underlying shingle 100 where an overlying shingle 100 will terminate and another shingle 100 will abut, all other marks should be fastened using nails or other fasteners, as appropriate.

In the illustrative example, described above, utilization of the 5⅝" measurement for rake starter, eave starter and field shingles 100 creates a constant in the finished installation. With marks placed accordingly, rake 108 and eave 106 starter shingles 116 can be removed from a full shingle 100 and utilized. Books 300 or starter shingles 116 can easily be created, with all facets of the roof 102 installation benefiting from the grid pattern created by the product itself.

Figure 6:
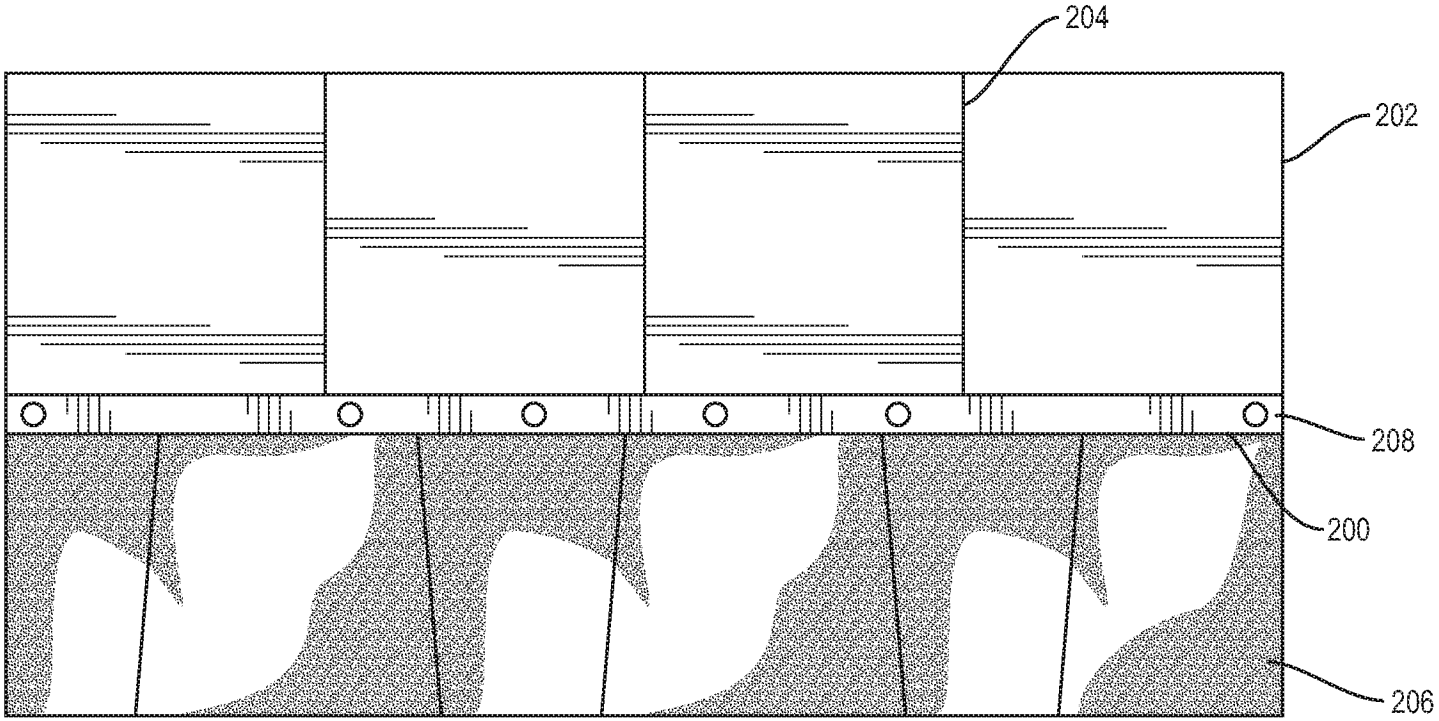
FIG. 6 is a front elevation view illustrating a shingle configured in accordance with one embodiment of the present invention.

Now referring to FIG. 6, a shingle 100 according to another embodiment of the present disclosure is shown. In this embodiment, three vertical alignment marks 204 are used. In this embodiment, a separate rake 108 starter shingle 116 would be required, since the height of this shingle 100 is not divisible by the width of a division demarcated by vertical alignment marks 204.

Now referring to the shingle 100 of the previous example, on a full shingle 100 the lines would be placed indicating where to trim the second, third and fourth course of shingles. Typically, for a Timberline shingle 100, the stagger which creates the pyramid would provide for marks creating a square and calls out trimming 6" off the second course, 11" off the third course, and 17" off the fourth course, and then installing a full shingle 100.

Other manufacturers may call out a 259.5 mm stagger over a 1038 mm shingle 100, thereby making the top of the shingle 100 unable to be used as a layout tool at the rake 108 location. This is due to the fact that 259.5 mm is greater than the 155.575 mm called out as the weather exposed portion, of such a shingle 100.

In either case, once the initial full shingle 100 has been installed and a pyramid created, full shingles 100 would be installed to the book 300 or starter block, providing for square lines, which can be relied on when installing upper shingle 100 courses.

Other shingle 100 manufacturer's call out different spacing for side laps and some require side laps continue through the entire shingle 100, creating a stagger through the fifth and sixth shingle 100 courses. Once again, this is for illustrative purposes only and many alternative combinations will be obvious to those of ordinary skill in the art in light of this disclosure. This embodiment may or may not utilize the top of the shingle 100 for eave 106 and rake 108 starter purposes.

Other embodiments of the present disclosure relate to marking of rake 108, ridge 110, eave 106 and dormer starter shingles 116, providing the applicator with an accurate method of laying out an asphalt shingle roof 102. Once the initial first course of shingles 100 has been installed the rake 108 and dormer starter shingles 116 can be installed at the interface of the eave 106 and field shingle 100 in such a fashion as to begin the layout procedure. Typically these shingles 100 would be created to an exact length corresponding to the reveal required for that field shingle 100. If a 5⅝" field shingle 100 expose is called out a 39⅜" length shingle may be advantageously used.

If an eave 106 starter shingle 116 is desired, marks may be placed onto the starter shingle 116 at the requisite intervals for a particular manufacturer. The purpose for a specific eave 106 and rake 108 starter shingle 116 would be to create the desired side lap onto the roofing underlayment. A shingle 100 can be placed at the eave 106 and at the ridge 110 of a structure and lines may be snapped through the starter shingles, creating a specific side lap pattern as called out by the manufacturer. Full shingles 100 may then be placed on the snapped line and may be cut afterwards at the rake 108 location, ensuring a consistent side lap reveal throughout the entire installation.

Figure 7:
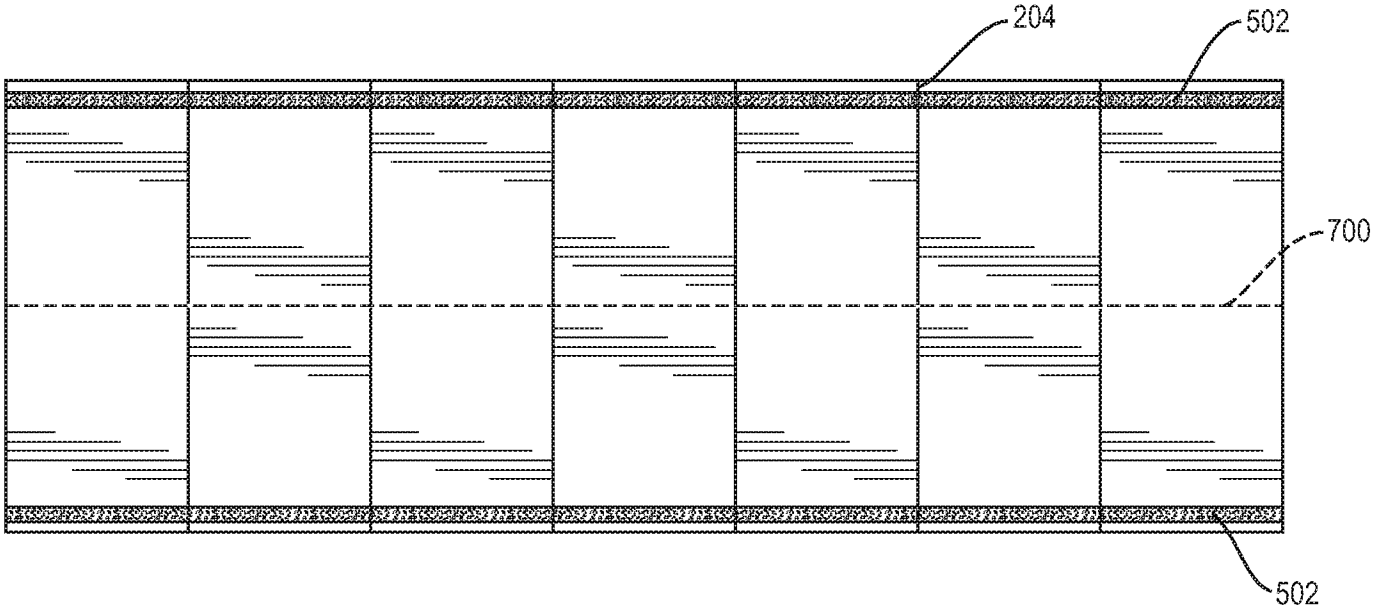
FIG. 7 is a front elevation view of a dual-starter shingle embodiment of the present disclosure having a perforation or other marking along its lengthwise center and dual adhesive strips adjacent its lengthwise edges, in accordance with embodiments of the present disclosure.

Now referring to FIG. 7, another embodiment of the present disclosure is shown having no headlap portion 202. This shingle 100 is intended to be a starter shingle 116 only, which may be cut or torn along a lengthwise perforation 700, located substantially in the center of the shingle 100 and running the length of the shingle 100. Embodiments also include dual adhesive strips 502 to help strengthen the shingle's 100 bond to underlayment and other surfaces on which it is to be mounted.

Figure 8:
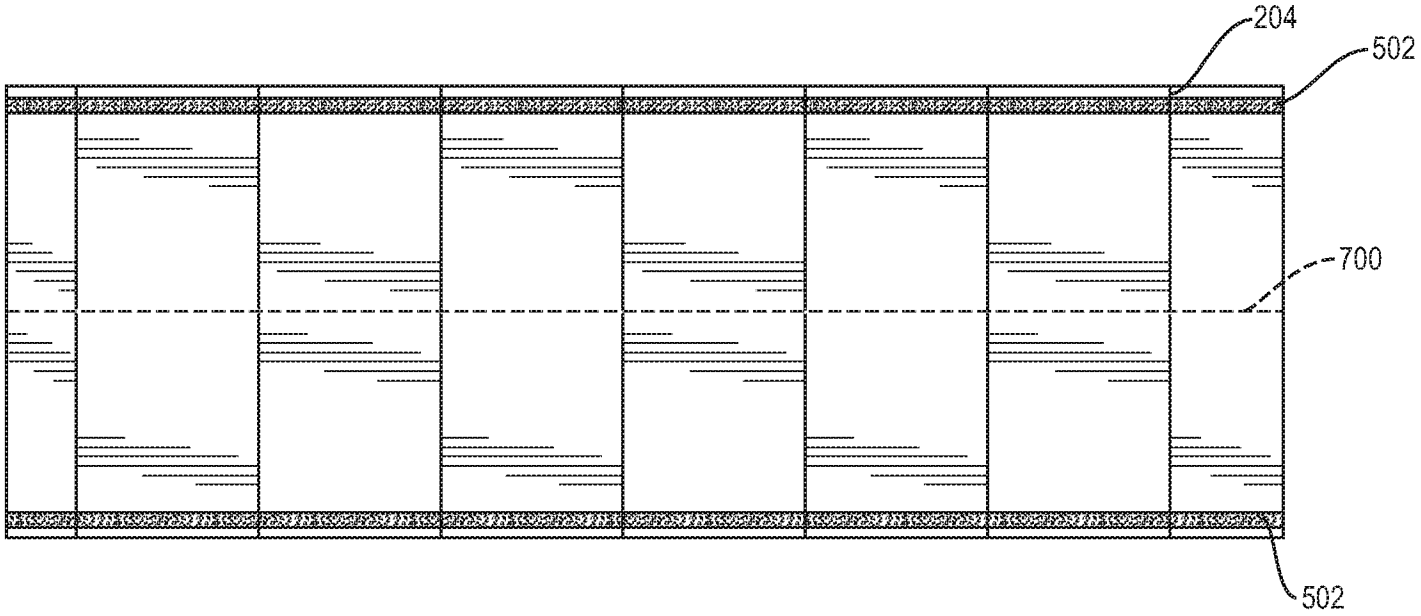
FIG. 8 is a front elevation view illustrating a shingle having two strips of adhesive laid thereon, one on each lengthwise edge, and relatively shorter first and last marked segments, in accordance with one embodiment of the present invention.

Now referring to FIG. 8, another embodiment of the present disclosure is shown wherein vertical alignment marks 204 may be spaced such that the use of the abutment region between adjacent shingles 100 is not used as an alignment mark; helping to ensure accurate alignment. For a typical, illustrative, embodiment using a 39⅜" shingle specified to have a 5⅝ reveal, seven vertical alignment marks 204 could be placed on a starter shingle 116 or a headlap region 202 of a field shingle 100 that could be adapted for use as a starter shingle 116 or a series of connected starter shingles 116, which could then be separated or installed in their entirety. On such shingles 100, marks would be placed at the following locations, as measured from an edge of the shingle 100: 3.625", 9.25", 14.875", 20.50", 26.125", 31.75" and 37.375". The placement of these vertical alignment marks 204 results in a 2.00" remnant remaining. When such a shingle 100 is abutted to an adjacent shingle, the first vertical alignment mark 204 of the adjacent shingle 100 will be exactly 5⅝" from the final vertical alignment mark 204 of the prior shingle 100; allowing a grid layout to be created without measuring tools or use of the abutment regions between shingles 100. Although this embodiment is shown used in conjunction with a starter shingle 116, it may be readily incorporated into a full shingle 100 or be provided in roll form 900.

Figure 9:
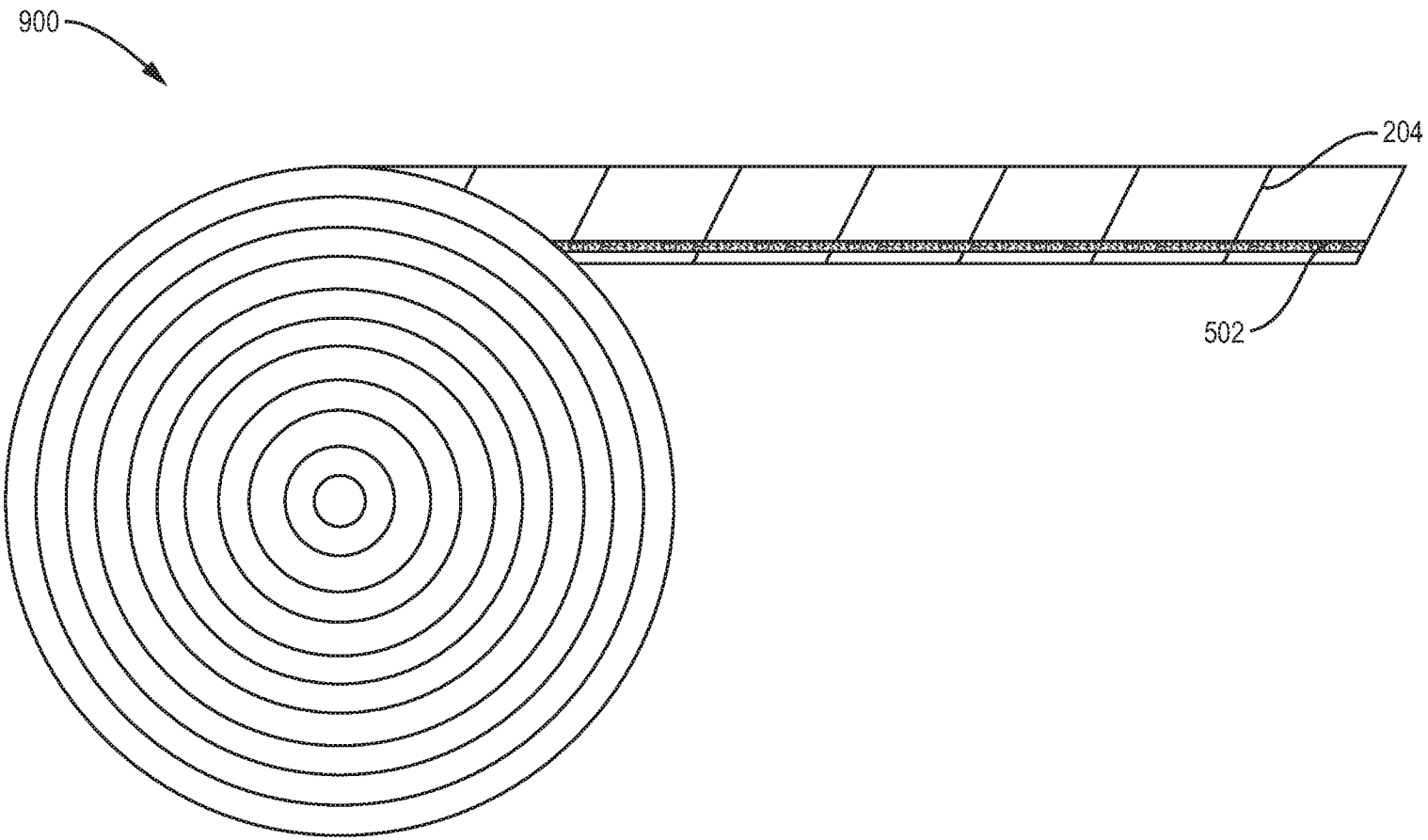
FIG. 9 is a right side elevation view of a roll form of starter shingle having an adhesive strip disposed adjacent a lengthwise edge, in accordance with one embodiment of the present invention.

Any of the embodiments previously or hereinafter described may conveniently be provided in discrete lengths or a roll form 900, as shown in FIG. 9. In some applications, it may also be desirable to provide a starter shingle only, rather than a full shingle; such a shingle 100 may also be provided in discrete lengths or a roll form 900 with single, dual or a plurality of adhesive strips 502, in embodiments parallel adhesive strips 502, laid thereon along its length without departing from the intended scope of this disclosure.

Figure 10:
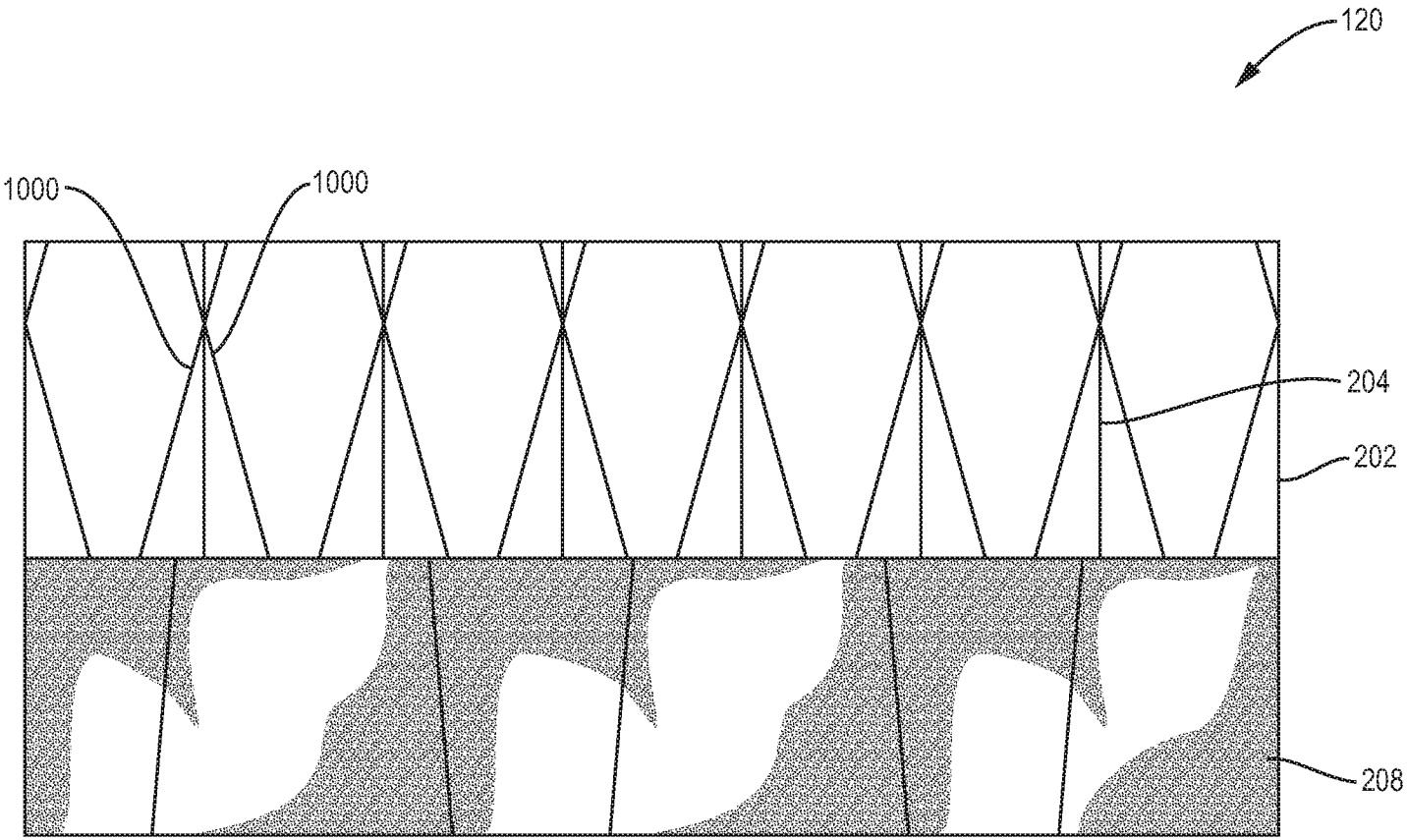
FIG. 10 is a top elevation view of an embodiment of the present disclosure suitable for use in a roof valley.

Now referring to FIG. 10, an embodiment suitable for use in the valley section 112 of a roof 102 is shown. This embodiment makes use of angled indication marks 1000 placed onto specialized valley shingles 120, to allow shingles 100 in a valley area 112 to be laid out while avoiding many of the steps required when using prior art shingles 100 by using the valley shingle 120 themselves as the layout tool.

Embodiments of the present disclosure for use in roof valleys 112 utilize angle markings 1000 corresponding with the pitch of the roof 102 they are to be installed on, which, in a typical construction, may be 4/12 rise/run, and 100 shingle reveal, which is typically specified by, and may vary between, manufacturers.

The pitch of the roof 102, when written as 4/12 should be interpreted as a rise of 4" for every 12" of length, and is also referred to as "rise in run." This is the common convention by which roofers and shingle manufacturers discuss the pitch of a roof 102. A rise in run of 4/12 corresponds to an angle of approximately 18.43 degrees or a grade of approximately 33.33%.

The aforementioned angled markings 1000, in embodiments, are placed on the headlap, or top, covered, portion 202 of the valley shingle 120. These angled markings 1000, in embodiments, will begin at the intersection of the exposed portion of the valley shingle 120 and the headlap portion 202, extending to the upper edge of the headlap portion 202. The angled markings 1000 may also be duplicated at a reverse angle to enable the valley shingle 120 to be used in any orientation.

The angle of the markings 1000, in embodiments, should be equivalent to the pitch of the roof and the distance between angled markings 1000 should be equivalent to the desired shingle reveal. The distance between any two points in adjacent angled markings 1000, in embodiments, should be equivalent to the specified valley shingle 120 reveal, when measured along a line parallel to the lengthwise edge of the valley shingle 120.

In other embodiments, the previously described headlap portion 202 may be provided without an accompanying tab portion 206. Such an embodiment would only require one set of angled markings 1000, as it could simply be rotated 180 degrees to provide the proper angled markings 1000, regardless of which side of a valley 112 it was to be installed upon.

Still other embodiments of the present invention may provide additional markings, such as hash marks, along the angled markings 1000 of the valley shingles 120 designating alternative roof 102 pitches, enabling a 4/12 valley shingle 120 of the present invention to be used on roofs 102 with different pitches. Such marks would typically be placed on a full angled marking 1000 and, as with the standard angled markings 1000, be separated by the specified shingle reveal.

Figure 11:
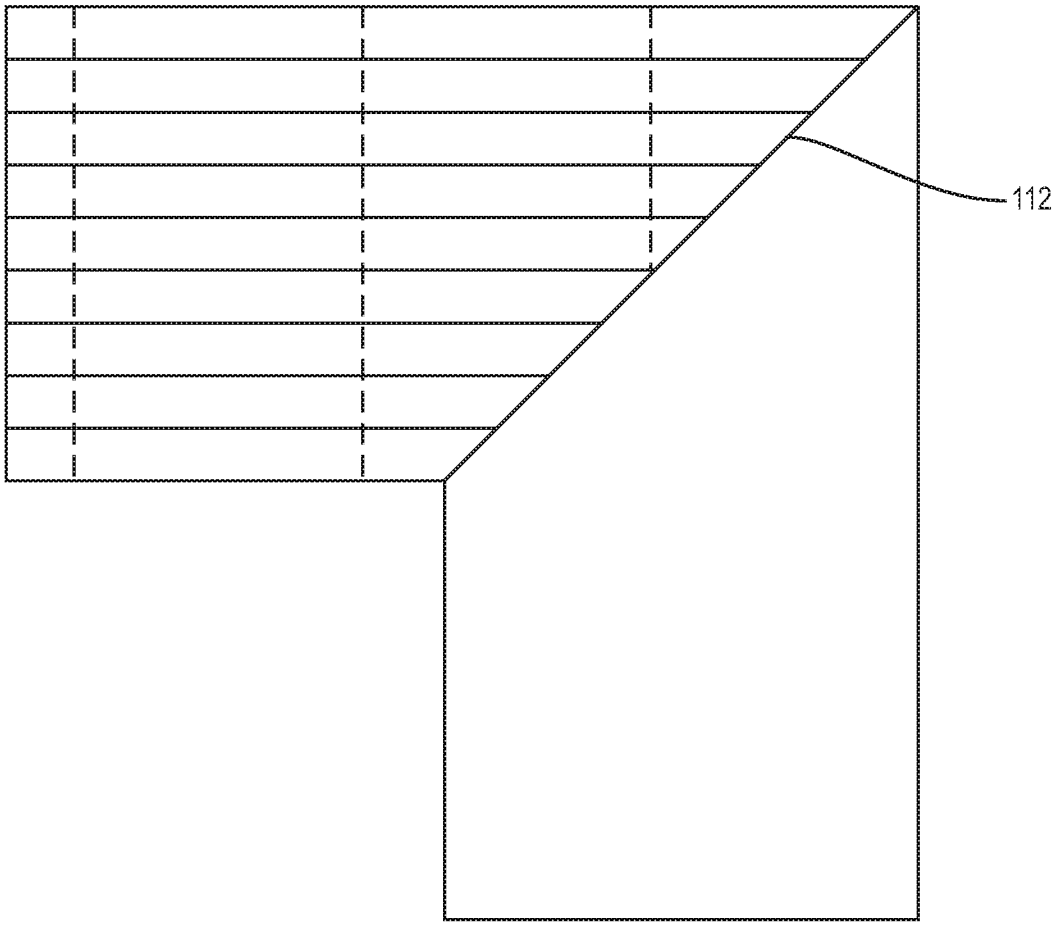
FIG. 11 is a roof with lines snapped off of starter shingles, ending in a valley area of the roof, in accordance with embodiments of the present disclosure.

Such angled markings 1000 allow for alignment of the valley shingles 120 in and around a valley 112, create a grid pattern and permit for snapping of lines as required when encountering a valley 112 transition on the roof 102, as shown in FIG. 11.

For example, when installing a valley shingle 120 which calls out a 5⅝" reveal to the weather, the distance between the lines will remain 5⅝" regardless of the pitch—hence the shingle reveal will remain 5⅝" if the markings 1000 are used for alignment. As such, proper valley shingle 120 reveal is easily verifiable when valley shingles 120 are installed in a valley 112.

Manufacturers typically recommended that when a valley 112 is encountered that it also becomes the starting point of the installation. This has to do with the fact that they prefer maximum coverage in the valley 112 and as such, a full field shingle 100 commencing the installation would be preferred. Common installations using the Open California Valley and the Closed Cut California Valley methods would benefit greatly by angle marks 1000 placed on the headlap portion 202 of specialized valley shingles 120, which differ from full field shingles 100 in that they have angled markings 1000 thereon.

Figure 12A:
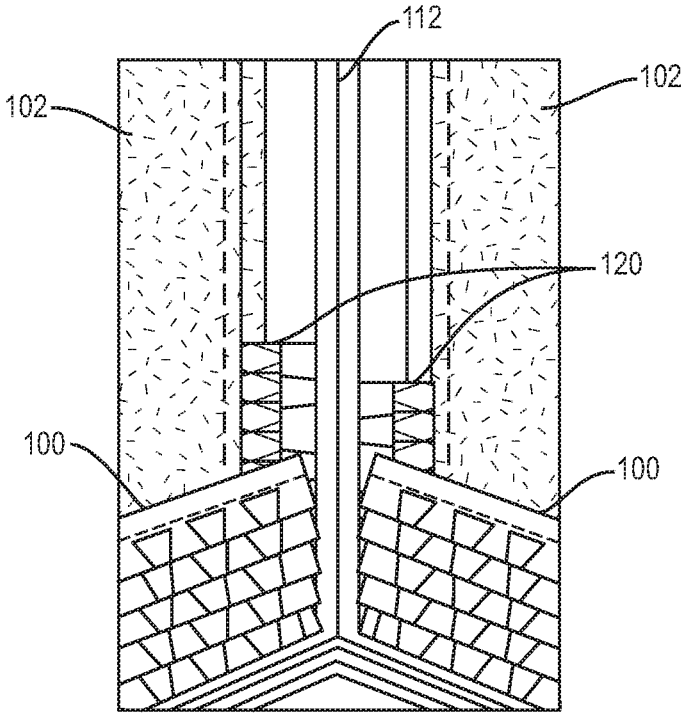
FIG. 12A is a front elevation view of a partially installed open California valley, using shingles in accordance with one embodiment of the present disclosure.

Now referring to FIG. 12A, an open California valley 1200 installation is shown, using valley shingles 120 in accordance with embodiments of the present disclosure. The procedure for installing an open California valley 1200, in accordance with embodiments of the present disclosure, is herein described. First, the requisite underlayment is installed. Next, a metal valley pan may be installed. After, two chalk lines may be snapped, one on either side of the valley 112, approximately 3" (76 mm) from the center of the valley 112, from the top to the bottom of the valley 112. The valley 114 may then be completed by installing a set of starter shingles 120 along the eave 106 and commencing the exposed finish roof 102 by installing a full field shingle 100 onto the starter shingle 120. The field shingle 100 should typically not be nailed within 18" of the valley.

The installer may then slide a full field shingle 100 along the interface of the valley shingle 120 and full field shingle 100, extending the shingle 100 up the valley 112 and along the chalk line, until the next angle indication mark 1000 lands on the top edge of the field shingle 100. Next, a single row of shingles 100 may be installed, fastening the shingles 100 end to end, with the butt edge or the exposed side of the shingle 100 towards the valley 112 continuing along each chalk line. Each shingle is installed by placing the tip of the field shingle 100 at the butt edge of the vertically installed valley shingle 120 and aligning the top of the shingle 100 with the angle marks 1000 placed onto the row of valley shingles 120 extending up the valley 112. After alignment, the field shingle 100 may be trimmed at the horizontal alignment mark 204 to provide for the requisite side lap requirement of the manufacturer.

When starting from the valley 112 utilizing the horizontal alignment marks 204, the horizontal saw teeth and the angle indication mark 1000 the field shingles 100 will come off square to the opposite side of the valley 112.

Figure 12B:
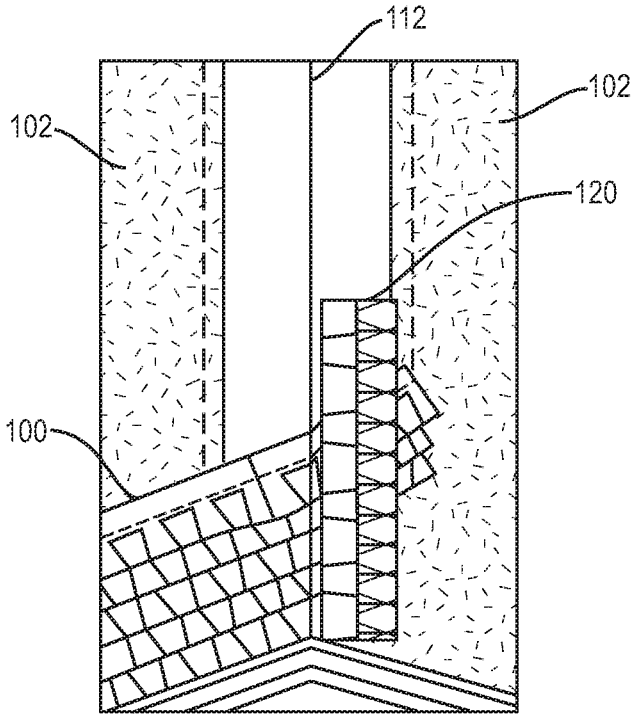
FIG. 12B is a front elevation view of a partially installed closed California valley, using shingles in accordance with one embodiment of the present disclosure.

Now referring to FIG. 12B, a closed cut California valley 1202 installation is shown, using valley shingles 120 in accordance with embodiments of the present disclosure. When installing a closed cut California valley 1202 in accordance with embodiments of the present invention, a line is typically snapped on one side of the valley 112 from the bottom to the top of the valley 112 approximately 2" out from the valley 112 center. After installing starter shingles 116, the installer would then place the first valley 120 into the valley 112 with the top of an angled mark 1000 intersecting the line previously snapped. The installer would then align the horizontal saw teeth and horizontal alignment mark 200 placed on the field shingle 100. This will square the shingle 100 to the eave 106 and to future field shingles 100 being installed. The full field shingle 100 would then be pressed into the valley 112, with the shingle 100 extending at least 12" (305 mm) beyond the valley 112 center line. The shingle 100 could then be fastened as required. This process is then repeated until the first side of the valley 112 is complete.

To complete the opposite side of the valley 112, a chalk line would be snapped approximately 2" inches back from the valley 112 centerline at the adjoining roof 102. The valley 112 would then be completed by installing a full field shingle 100 onto the adjoining roof 102, permitting for the shingle 100 to elevate as required, so as to insert a field shingle 100 running up the valley 112, along the chalk line created earlier. The shingle 100 would then be elevated and a full field shingle 100 installed, extending the shingle 100 up the valley, until an angled mark 1000 lands on the top termination point of the field shingle 100, at which point the shingle 100 could be fastened as required.

After valley 112 completion, one row of shingles 100 could then be installed by fastening the shingles 100 end to end, with the butt edge or the exposed side of the shingle 100 towards the valley 112, along each chalk line. Completion of the larger field area of the roof 102 would then be commenced by installing each shingle 100, placing the tip of the field shingle 100 at the butt edge of the vertically installed valley shingle 120 and aligning the top of the field shingle 100 with the angled marks 1000 placed onto the row of valley shingles 120 extending up the valley 112. Next, the field shingle 100 may be trimmed at the horizontal alignment mark 200, providing for the requisite side lap requirement of the manufacturer.

When starting from the valley 112 utilizing the horizontal alignment mark 200, the horizontal saw tooth line and the angle indication marks 1000 the square-ness of the shingles 100 on opposite sides of the valley 112, ensuring an accurate installation which can be visually confirmed.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An asphalt shingle designed to be laid up in courses on a roof comprising:

an upper headlap portion, a lower tab portion, vertically spaced apart upper and lower edges, laterally spaced apart right and left edges, and top and bottom surfaces, having a lateral dimension or width and a vertical dimension or height;

[at least one adhesive strip disposed across the width of the shingle on the top surface thereof;] and a horizontally-oriented marking that extends along an interface between said upper headlap portion and said lower tab portion of said shingle and stretches from said right to left edge thereof, spanning the width of the shingle, wherein the lateral dimension of the shingle is greater than the vertical dimension of the shingle, wherein said bottom surface is configured to be laid up on the roof facing the roof, wherein said tab portion is configured to be substantially weather-exposed when laid up on the roof and wherein said upper headlap portion is configured to be substantially covered by the tab portion of asphalt shingles in a next-overlying course of asphalt shingles when laid up on the roof, [and]

*wherein said horizontally-oriented marking defines a boundary line between the upper headlap portion and the lower tab portion of the shingle,* wherein said horizontally-oriented marking is configured to act as a headlap alignment mark and run perpendicularly to a rake of the roof and/or parallel to an eave of the roof following installation of the shingle thereon, defining a position on which the upper edge of an asphalt shingle in a previous course of asphalt shingles abut to establish a headlap,

*wherein said horizontally-oriented marking is configured to remain usable even where the right and left edges of the shingle have been removed, and*

*wherein the laterally spaced apart right and left edges are substantially planar in the upper headlap portion of the shingle*.

[2. The asphalt shingle of claim 1 wherein said shingle is a three-tab shingle.]

3. The asphalt shingle of claim 1 wherein said horizontally-oriented marking comprises gaps therein that *each* align with [cut-outs] *a cut-out* in the *lower tab portion of the* shingle.

4. The asphalt shingle of claim 3 wherein said horizontally-oriented marking is configured to *be at least partially exposed to the environment following installation of the shingle and to* fade upon weather exposure.

[5. The asphalt shingle of claim 1 wherein said at least one adhesive strip runs parallel to said upper and lower edges of said shingle.]

6. The shingle of claim 1 wherein said shingle is structurally weakened along said horizontally-oriented marking such that said shingle may be readily divided along said horizontally-oriented marking and the headlap portion thereof used as a rake or eave starter shingle.

7. The shingle of claim 1 wherein horizontally-oriented marking is also marked on the back side of the shingle.

8. The shingle of claim 1 further comprising nail placement marks that provide specific nail placement locations.

[9. The shingle of claim 8 wherein said nail placement marks are positioned on said horizontally-oriented marking.]

10. The shingle of claim [9] *8*wherein said nail placement marks are evenly laterally spaced.

11. The shingle of claim 8 wherein said nail placement marks comprise dots, indentations, perforations, [cuts,] and/or lines.

[12. The shingle of claim 1 wherein said horizontally-oriented marking is positioned above said adhesive strip.]

[13. The shingle of claim 1 wherein said horizontally-oriented marking is positioned on said adhesive strip.]

[14. The shingle of claim 1 wherein said horizontally-oriented marking is positioned below said adhesive strip.]

15. The shingle of claim 1 further comprising a cut at a proximal and distal end of said horizontally-oriented marking.

16. The shingle of claim 1 further comprising at least one additional horizontally-oriented marking, wherein said at least one additional horizontally-oriented marking is configured to act as a headlap alignment mark and run perpendicularly to the rake of the roof and/or parallel to the eave of the roof following installation of the shingle thereon, defining an alternative position on which the upper edge of an asphalt shingle in a previous course of asphalt shingles must abut to establish a second headlap.

17. A method of roofing using the shingle of claim 1, the method comprising:

providing a shingle in accordance with claim 1;

*dividing the shingle into several, shortened shingles of various widths, creating a book of shingles;* fixing said shingle to a roof, beginning at a rake edge;

applying as many shingles as necessary to complete a course of shingles to the roof;

cutting a final shingle at an opposing rake edge such that it terminates substantially at the opposing rake edge; and beginning a subsequent course of shingles above the previous course of shingles by abutting the upper edge of an asphalt shingle to the horizontally-oriented marking of the shingle used in the previous course,

*wherein at least one of the shortened shingles does not include either a right or left edge of the original shingle.*

18. The method of claim 17 wherein abutting the upper edge of an asphalt shingle to the horizontally-oriented marking of the shingle used in the previous course comprises aligning the horizontally-oriented marking to the upper edge of an asphalt shingle used in the previous course on an edge thereof, fastening the shingle to the roof at the aligned edge and pivoting the shingle on the fastener until the horizontally-oriented marking is fully aligned with the upper edge of the asphalt shingle of the previous course before fastening the shingle along its length, thereby fixing its position.

19. An asphalt shingle designed to be laid up in courses on a roof comprising:

[an upper headlap portion, a lower tab portion, vertically spaced apart upper and lower edges, laterally spaced apart right and left edges, and top and bottom surfaces, having a lateral dimension or width and a vertical dimension or height;

at least one adhesive strip disposed across the width of the shingle on the top surface thereof; and]

a horizontally-oriented marking that extends along an interface between [said] *an* upper headlap portion and [said] *a* lower tab portion of said shingle and stretches from [said] *a* right to left edge thereof, spanning the width of the shingle,

[wherein the lateral dimension of the shingle is greater than the vertical dimension of the shingle, wherein said bottom surface is configured to be laid up on the roof facing the roof, wherein said tab portion is configured to be substantially weather-exposed when laid up on the roof and wherein said upper headlap portion is configured to be substantially covered by the tab portion of asphalt shingles in a next-overlying course of asphalt shingles when laid up on the roof, wherein the shingle is a three-tab shingle, and]

wherein said horizontally-oriented marking is configured to act as a headlap alignment mark and run perpendicularly to a rake of the roof following installation of the shingle thereon, defining a position on which the upper edge of an asphalt shingle in a previous course of asphalt shingles abut to establish a headlap,

*wherein said horizontally-oriented marking is configured to remain usable even where the right and left edges of the shingle have been removed,*

*wherein said horizontally-oriented marking defines a boundary line between the upper headlap portion and the lower tab portion of the shingle, and*

*wherein the laterally spaced apart right and left edges are substantially planar in the upper headlap portion of the shingle.*

*20. The asphalt shingle of claim 1 further comprising at least one adhesive strip disposed on a top or bottom surface thereof and configured to adhere said shingle to an underlying or overlying course of shingles.*

*21. The asphalt shingle of claim 19 further comprising at least one adhesive strip disposed on a top or bottom surface thereof and configured to adhere said shingle to an underlying or overlying course of shingles.*

*22. The shingle of claim 16 wherein an area of the shingle bounded by said horizontally-oriented marking and an additional horizontally-oriented marking denotes a nailing zone through which fasteners should be inserted.*

*23. The shingle of claim 1 wherein the horizontally-oriented marking is visible across the entire width of the shingle.*

*24. The shingle of claim 19 wherein the horizontally-oriented marking is visible across the entire width of the shingle.*

* * * * *